US012100379B2

(12) United States Patent
Yamabe et al.

(10) Patent No.: US 12,100,379 B2
(45) Date of Patent: Sep. 24, 2024

(54) ACOUSTIC PROCESSING APPARATUS AND ACOUSTIC PROCESSING METHOD

(71) Applicant: SONY GROUP CORPORATION, Tokyo (JP)

(72) Inventors: Yushi Yamabe, Tokyo (JP); Mahendra Kodavati, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 297 days.

(21) Appl. No.: 17/635,057

(22) PCT Filed: Jun. 2, 2020

(86) PCT No.: PCT/JP2020/021755
§ 371 (c)(1),
(2) Date: Feb. 14, 2022

(87) PCT Pub. No.: WO2021/039004
PCT Pub. Date: Mar. 4, 2021

(65) Prior Publication Data
US 2022/0293082 A1 Sep. 15, 2022

(30) Foreign Application Priority Data
Aug. 23, 2019 (JP) ................................ 2019-152760

(51) Int. Cl.
*G10K 11/178* (2006.01)
*H04R 1/10* (2006.01)

(52) U.S. Cl.
CPC .. *G10K 11/17853* (2018.01); *G10K 11/17827* (2018.01); *H04R 1/1041* (2013.01); *H04R 1/1083* (2013.01)

(58) Field of Classification Search
CPC ........ G10K 11/17853; G10K 11/17827; H04R 1/1041; H04R 1/1083
See application file for complete search history.

(56) References Cited

U.S. PATENT DOCUMENTS

| | | | |
|---|---|---|---|
| 6,118,878 | A | 9/2000 | Jones |
| 2016/0267898 | A1 | 9/2016 | Terlizzi |

FOREIGN PATENT DOCUMENTS

| | | | |
|---|---|---|---|
| CN | 107408381 A | 11/2017 |
| EP | 0705472 A1 | 4/1996 |
| JP | 08-510565 A | 11/1996 |
| WO | 95/000946 A1 | 1/1995 |
| WO | 2016/144509 A1 | 9/2016 |
| WO | 2017/217106 A1 | 12/2017 |

OTHER PUBLICATIONS

International Search Report and Written Opinion of PCT Application No. PCT/JP2020/021755, issued on Aug. 25, 2020, 09 pages of ISRWO.

*Primary Examiner* — David L Ton
(74) *Attorney, Agent, or Firm* — CHIP LAW GROUP

(57) ABSTRACT

Provided is an acoustic processing apparatus that includes an attachment unit, a sensor that detects deformation of the attachment unit attached to an ear portion of a user, and a control unit that switches a mode for noise cancelling in accordance with a detection result of the deformation of the attachment unit.

14 Claims, 33 Drawing Sheets

FIG. 13

$$P_0 = \mathrm{NF} + d_2 + P_1 HM$$

$$P_1 = P_2 + P_4$$

$$P_2 = P_3 + m$$

$$P_3 = P_5 + P_7$$

$$P_4 = -\alpha(N + d_1)$$

$$P_5 = \beta_1 P_9$$

$$P_6 = P_4 + m$$

$$P_7 = \beta_2 P_{10}$$

$$P_8 = HM' P_3$$

$$P_9 = -P_0 + P_{11}$$

$$P_{10} = P_9 + P_8$$

$$P_{11} = HM' P_6$$

FIG. 14

$$p_0 = \frac{-\alpha HM(1+\beta_1 HM')N \quad + (1-\beta_2 HM')NF \quad - \alpha HM(1+\beta_1 HM')d1 \quad + (1-\beta_2 HM')d2 \quad + HM(1+\beta_1 HM')m}{1+\beta_2(HM-HM')+\beta_1 HM}$$

$$p_1 = \frac{-\alpha(1+\beta_1 HM')N \quad -(\beta_1+\beta_2)NF \quad -\alpha(1+\beta_1 HM')d1 \quad -(\beta_1+\beta_2)d2 \quad +(1+\beta_1 HM')m}{1+\beta_2(HM-HM')+\beta_1 HM}$$

$$p_2 = \frac{\alpha(\beta_1+\beta_2)(HM-HM')N \quad -(\beta_1+\beta_2)NF \quad +\alpha(\beta_1+\beta_2)(HM-HM')d1 \quad -(\beta_1+\beta_2)d2 \quad +(1+\beta_1 HM')m}{1+\beta_2(HM-HM')+\beta_1 HM}$$

$$p_3 = \frac{\alpha(\beta_1+\beta_2)(HM-HM')N \quad -(\beta_1+\beta_2)NF \quad +\alpha(\beta_1+\beta_2)(HM-HM')d1 \quad -(\beta_1+\beta_2)d2 \quad -(\beta_1+\beta_2)(HM-HM')m}{1+\beta_2(HM-HM')+\beta_1 HM}$$

$$p_4 = -\alpha N - \alpha d1 = \frac{-\alpha(1+\beta_2(HM-HM')+\beta_1 HM)N \quad -\alpha(1+\beta_2(HM-HM')+\beta_1 HM)d1}{1+\beta_2(HM-HM')+\beta_1 HM}$$

$$p_5 = \frac{\alpha\beta_1(1-\beta_2 HM')(HM-HM')N \quad -\beta_1(1-\beta_2 HM')NF \quad +\alpha\beta_1(1-\beta_2 HM')(HM-HM')d1 \quad -\beta_1(1-\beta_2 HM')d2 \quad -\beta_1(1-\beta_2 HM')(HM-HM')m}{1+\beta_2(HM-HM')+\beta_1 HM}$$

$$p_6 = -\alpha N - \alpha d1 + m = \frac{-\alpha(1+\beta_2(HM-HM')+\beta_1 HM)N \quad -\alpha(1+\beta_2(HM-HM')+\beta_1 HM)d1 \quad +(1+\beta_2(HM-HM')+\beta_1 HM)m}{1+\beta_2(HM-HM')+\beta_1 HM}$$

F I G . 1 5

$$p_7 = \frac{\alpha\beta_2(1+\beta_1 HM')(HM-HM')N \quad -\beta_2(1+\beta_1 HM')NF \quad +\alpha\beta_2(1+\beta_1 HM')(HM-HM')d1 \quad -\beta_2(1+\beta_1 HM')d2 \quad -\beta_2(1+\beta_1 HM')(HM-HM')m}{1+\beta_2(HM-HM')+\beta_1 HM}$$

$$p_8 = \frac{\alpha(\beta_1+\beta_2)HM'(HM-HM')N \quad -(\beta_1+\beta_2)HM'NF \quad +\alpha(\beta_1+\beta_2)HM'(HM-HM')d1 \quad -(\beta_1+\beta_2)HM'd2 \quad -(\beta_1+\beta_2)HM'(HM-HM')m}{1+\beta_2(HM-HM')+\beta_1 HM}$$

$$p_9 = \frac{\alpha(1-\beta_2 HM')(HM-HM')N \quad -(1-\beta_2 HM')NF \quad +\alpha(1-\beta_2 HM')(HM-HM')d1 \quad -(1-\beta_2 HM')d2 \quad -(1-\beta_2 HM')(HM-HM')m}{1+\beta_2(HM-HM')+\beta_1 HM}$$

$$p_{10} = \frac{\alpha(1+\beta_1 HM')(HM-HM')N \quad -(1+\beta_1 HM')NF \quad +\alpha(1+\beta_1 HM')(HM-HM')d1 \quad -(1+\beta_1 HM')d2 \quad -(1+\beta_1 HM')(HM-HM')m}{1+\beta_2(HM-HM')+\beta_1 HM}$$

$$p_{11} = -\alpha HM'N - \alpha HM'd1 + HM'm \quad = \frac{-\alpha HM'(1+\beta_2(HM-HM')+\beta_1 HM)N \quad -\alpha HM'(1+\beta_2(HM-HM')+\beta_1 HM)d1 \quad + HM'(1+\beta_2(HM-HM')+\beta_1 HM)m}{1+\beta_2(HM-HM')+\beta_1 HM}$$

FIG. 16

| Px | m | Nf+d2 | N+d1 |
|---|---|---|---|
| P0 | $HM(1+\beta_1 HM'^{-N}_Z)$ | $(1-\beta_2 HM'^{-N}_Z)$ | $-\alpha HM(1+\beta_2 HM'^{-N}_Z)$ |
| P1 | $(1+\beta_1 HM'^{-N}_Z)$ | $-(\beta_1+\beta_2)$ | $-\alpha(1+\beta_1 HM'^{-N}_Z)$ |
| P2 | $(1+\beta_1 HM'^{-N}_Z)$ | $-(\beta_1+\beta_2)$ | $\alpha(\beta_1+\beta_2)(HM-HM'^{-N}_Z)$ |
| P3 | $-(\beta_1+\beta_2)(HM-HM'^{-N}_Z)$ | $-(\beta_1+\beta_2)$ | $\alpha(\beta_1+\beta_2)(HM-HM'^{-N}_Z)$ |
| P4 | – | – | $-\alpha(1+\beta_2(HM-HM'^{-N}_Z)+\beta_1 HM)$ |
| P5 | $-\beta_1(1-\beta_2 HM'^{-N}_Z)(HM-HM'^{-N}_Z)$ | $-\beta_1(1-\beta_2 HM'^{-N}_Z)$ | $\alpha\beta_1(1-\beta_2 HM'^{-N}_Z)(HM-HM'^{-N}_Z)$ |
| P6 | $(1+\beta_2(HM-HM'^{-N}_Z)+\beta_1 HM)$ | – | $-\alpha(1+\beta_2(HM-HM'^{-N}_Z)+\beta_1 HM)$ |
| P7 | $-\beta_2(1+\beta_1 HM'^{-N}_Z)(HM-HM'^{-N}_Z)$ | $-\beta_2(1-\beta_1 HM'^{-N}_Z)$ | $\alpha\beta_2(1+\beta_1 HM'^{-N}_Z)(HM-HM'^{-N}_Z)$ |
| P8 | $-(\beta_1+\beta_2)HM'^{-N}_Z(HM-HM'^{-N}_Z)$ | $-(\beta_1+\beta_2)HM'^{-N}_Z$ | $\alpha(\beta_1+\beta_2)HM'^{-N}_Z(HM-HM'^{-N}_Z)$ |
| P9 | $-(1-\beta_2 HM'^{-N}_Z)(HM-HM'^{-N}_Z)$ | $-(1-\beta_2 HM'^{-N}_Z)$ | $\alpha(1-\beta_2 HM'^{-N}_Z)(HM-HM'^{-N}_Z)$ |
| P10 | $-(1+\beta_1 HM'^{-N}_Z)(HM-HM'^{-N}_Z)$ | $-(1+\beta_1 HM'^{-N}_Z)$ | $\alpha(1+\beta_1 HM'^{-N}_Z)(HM-HM'^{-N}_Z)$ |
| P11 | $HM'^{-N}_Z(1+\beta_2(HM-HM'^{-N}_Z)+\beta_1 HM)$ | – | $-\alpha HM'^{-N}_Z(1+\beta_2(HM-HM'^{-N}_Z)+\beta_1 HM)$ |

FIG. 17

| | | NOISE | |
|---|---|---|---|
| | | HIGH | LOW |
| MUSIC | HIGH | PATTERN 1 | PATTERN 3 |
| | LOW | PATTERN 2 | PATTERN 4 |

FIG. 18

| ATTACHMENT STATE | ⊿HM | β Filter | Open Loop = −β HM | Howling_predict |
|---|---|---|---|---|
| NORMAL ATTACHMENT | LOW ( = HM (LOW)) | FILTER CIRCUIT 224B ($\beta_2$ = HIGH) | LOW × HIGH = LOW (NO HOWLING) | 0 |
| ABNORMAL ATTACHMENT | HIGH ( = HM (HIGH)) | FILTER CIRCUIT 224A ($\beta_1$ = LOW) | HIGH × LOW = LOW (NO HOWLING) | 1 |

ACOUSTIC PROCESSING APPARATUS AND ACOUSTIC PROCESSING METHOD

CROSS REFERENCE TO RELATED APPLICATIONS

This application is a U.S. National Phase of International Patent Application No. PCT/JP2020/021755 filed on Jun. 2, 2020, which claims priority benefit of Japanese Patent Application No. JP 2019-152760 filed in the Japan Patent Office on Aug. 23, 2019. Each of the above-referenced applications is hereby incorporated herein by reference in its entirety.

TECHNICAL FIELD

The present disclosure relates to an acoustic processing apparatus, an acoustic processing method, and a program.

BACKGROUND ART

A noise cancelling system is known as a system which provides a preferable musical composition reproduction environment for a listener (user) by reducing (cancelling) a noisy sound (noise) in an external environment when the listener listens to a musical composition or the like using an earphone, a headphone, or the like. Specifically, a feedback type noise cancelling method which uses a microphone provided inside a housing and a feedforward type noise cancelling method which uses a microphone provided outside a housing are known. Moreover, PTL 1 identified below describes a feedback type noise cancelling method which uses an internal model control system (IMC (Internal Model Control) system).

CITATION LIST

Patent Literature

[PTL 1]
PCT Patent Publication No. WO2017/217106

SUMMARY

Technical Problem

When an attachment state of an earphone or a headphone attached to an ear portion of a user is different from that in a normal state, howling may be generated. Such howling gives discomfort to the user listening to a musical composition. Accordingly, such control which eliminates howling while appropriately maintaining noise cancelling performance is desired.

One of objects of the present disclosure is to provide an acoustic processing apparatus, an acoustic processing method, and a program for achieving control which eliminates howling while appropriately maintaining noise cancelling performance.

Solution to Problem

For example, the present disclosure is directed to an acoustic processing apparatus including a sensor that detects deformation of an attachment unit attached to an ear portion of a user, and a control unit that switches a mode for noise cancelling in accordance with a detection result of deformation of the attachment unit.

For example, the present disclosure is directed to an acoustic processing apparatus including a control unit that switches a mode for noise cancelling by switching a characteristic of a filter to be used, in accordance with a change in a transfer function produced in accordance with deformation of an attachment unit. The control unit switches a detection signal for detecting the change of the transfer function, in accordance with power of a voice signal reproduced via the attachment unit and a level of noise.

For example, the present disclosure is directed to an acoustic processing method including causing a sensor to detect deformation of an attachment unit attached to an ear portion of a user, and causing a control unit to switch a mode for noise cancelling in accordance with a detection result of deformation of the attachment unit.

For example, the present disclosure is directed to a program causing a computer to execute an acoustic processing method that causes a sensor to detect deformation of an attachment unit attached to an ear portion of a user and causes a control unit to switch a mode for noise cancelling in accordance with a detection result of deformation of the attachment unit.

BRIEF DESCRIPTION OF DRAWINGS

FIG. 13 is a diagram presenting expressions each representing a signal at Px.

FIG. 14 presents results obtained by solving simultaneous expressions for the respective points Px.

FIG. 15 presents results obtained by solving simultaneous expressions for the respective points Px.

FIG. 16 is a diagram where the results presented in FIGS. 14 and 15 are sorted for each item.

FIG. 17 is a diagram referred to for explaining a setting example of a detection signal.

FIG. 18 is a diagram referred to for explaining an operation example of the headphone according to the present embodiment.

DESCRIPTION OF EMBODIMENT

An embodiment and others of the present disclosure will be hereinafter described with reference to the drawings. Note that the description will be presented in the following order.

Problems to be Considered in Embodiment

One Embodiment

<Modifications>

The embodiment and others described hereinafter are preferred specific examples of the present disclosure. Contents of the present disclosure are not limited to the embodiment and others described herein.

Problems to be Considered in Embodiment

Problems to be considered in the embodiment will first be described for easy understanding of the present disclosure.

As described above, a method of noise cancelling is roughly divided into a feedback system and a feedforward system. In the following description, the feedback system will be referred to as an FB system, and the feedforward system will be referred to as an FF system where appropriate.

Figure 1A:
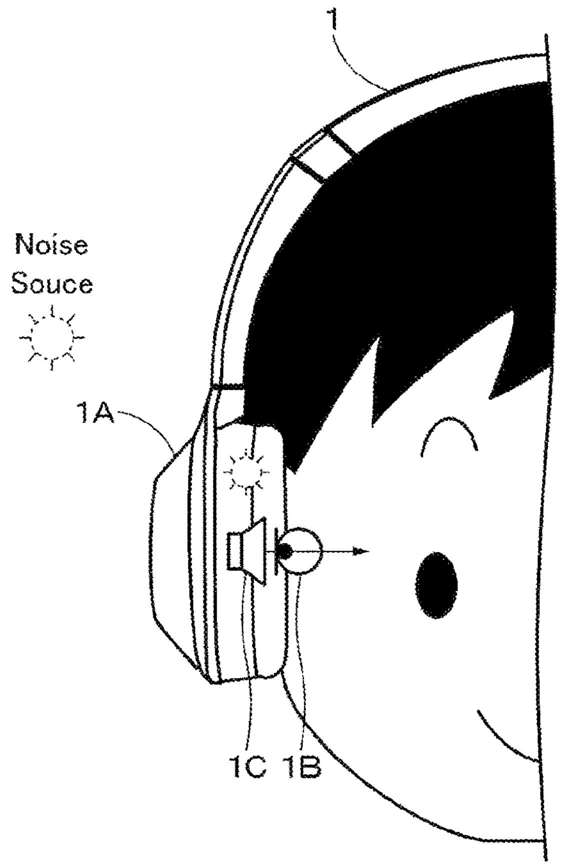
FIGS. 1A and 1B are diagrams each referred to for explaining problems to be considered in an embodiment.

Generally, as depicted in FIG. 1A, the FB system is a system which includes a microphone 1B disposed inside a headphone housing 1A, and is configured to return an antiphase component of a signal of a sound collected by the microphone 1B to an input side, and perform servo control to attenuate noise entering the housing from the outside. In this case, a sound at a microphone position corresponds to a control point. Accordingly, in general, the microphone 1B is often provided at a position close to the ear, i.e., on a front surface of a diaphragm of a speaker 1C (driver) in consideration of a noise attenuation effect.

Figure 1B:
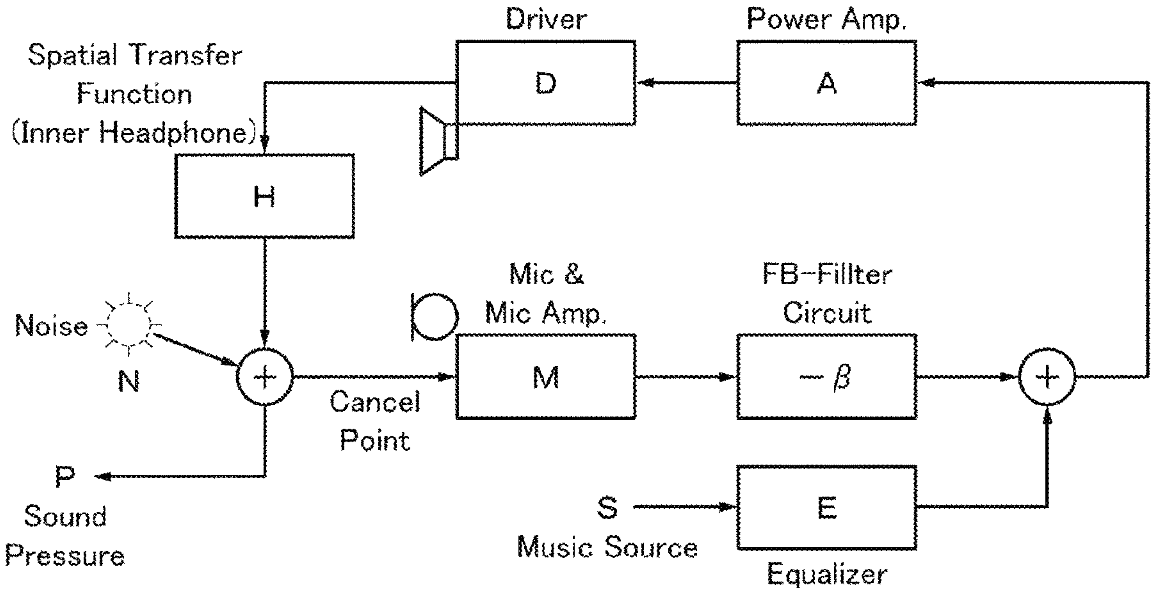

FIG. 1B is a block diagram depicting a configuration example for achieving the FB system. In the figure, A, D, M, and −β represent transfer functions of a power amplifier, a driver, a microphone and a microphone amplifier, and a filter designed for feedback, respectively. Moreover, H in the figure represents a transfer function in a space from the driver to the microphone (microphone 1B). It is assumed that the respective transfer functions are expressed by complex representation. Further, it is assumed that N represents noise entering the vicinity of the microphone 1B inside the headphone from an external noise source and that P represents a sound pressure reaching an ear of a listener (user). In addition, it is assumed that E in the following description represents a transfer function of an equalizer applied to a signal S corresponding to a listening target. Examples of a factor which causes transmission of noise into the headphone include noise leaking through a clearance of an earpad or an earpiece as a sound pressure, noise from a hole so formed as to connect a front surface of the headphone and the outside world, and a sound transmitted into a housing interior as a result of vibration of the headphone housing having received a sound pressure.

The sound pressure P in the block diagram depicted in FIG. 1B here can be represented by the following Expression 1.

(Expression 1)

$$P = \frac{1}{1 + ADHM\beta}N + \frac{AHD}{1 + ADHM\beta}ES \tag{1}$$

Focusing on N in Expression 1, it is apparent that the noise N is attenuated to 1/(1+ADHMβ).

However, for achieving a stable operation of the system expressed as Expression 1 without oscillation, the following Expression 2 needs to hold.

(Expression 2)

$$\left|\frac{1}{1 + ADHM\beta}\right| < 1 \tag{2}$$

Generally, Expression 2 can be interpreted in the following manner in conjunction with the following Expression 3.

(Expression 3)

$$1 << |ADHM\beta| \tag{3}$$

In FIG. 1B, the following Expression 4

Figure 2:
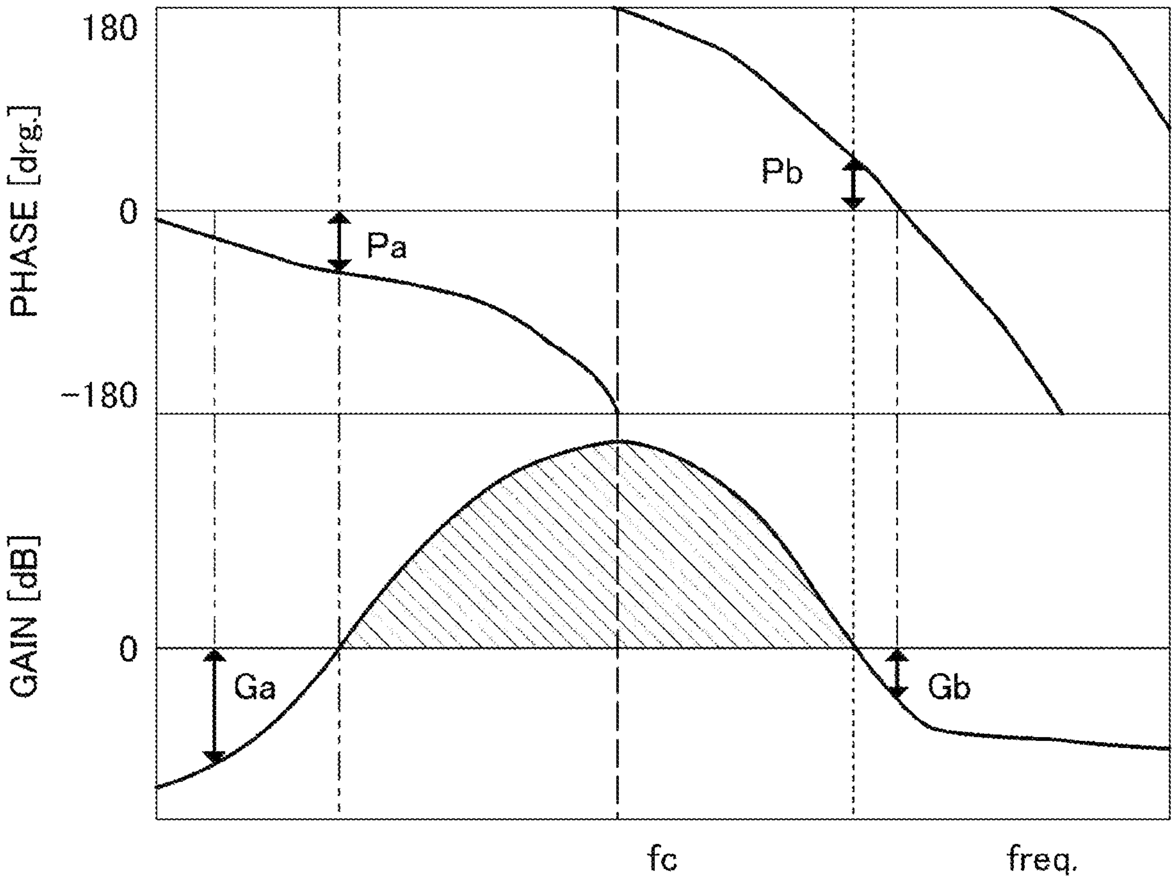
FIG. 2 is a diagram referred to for explaining problems to be considered in the embodiment.

(Expression 4)

$$-(ADHM\beta) \quad (4)$$

as a part cut from a loop portion associated with the noise N will be referred to as an "open loop," and has a characteristic expressed as a Bode plot depicted in FIG. 2, for example.

In a case where this open loop is a target, the following two conditions need to be met as the above conditions.

The gain needs to be smaller than 0 dB when a point of 0 degree phase is passed through.

The point of 0 degree phase needs to be excluded when the gain is 0 dB or larger. In a case where the above conditions are not met, positive feedback is applied to the loop. As a result, howling (oscillation) is generated. In FIG. 2, each of Pa and Pb represents a phase margin, while each of Ga and Gb represents a gain margin. When these margins are small, a risk of howling may increase depending on individual differences or attachment variations.

Next described will be execution of reproduction of a necessary sound from the headphone in addition to the noise reduction function described above. Note that S in an actual situation is not only a music signal but also a sound corresponding to a general term of signals supposed to be reproduced by the driver of the headphone, such as a sound of a microphone provided outside the housing (used as a hearing aid function) and an audio signal via communication (used as a headset).

Focusing on S in Expression 1, P is expressed as the following Expression 6 when the equalizer is set as represented by the following Expression 5.

(Expression 5)

$$E + (1 + ADHM\beta) \quad (5)$$

(Expression 6)

$$P = \frac{1}{1 + ADHM\beta}N + AHDS \quad (6)$$

If the microphone 1B is located at a position extremely close to the ear position, it is obvious that a characteristic similar to that of a headphone which does not have an ordinary noise reduction function is obtained in a state that H represents a transfer function from the driver to the microphone (ear) and that A and D are transfer functions of characteristics of the power amplifier and the driver, respectively.

Figure 3A:
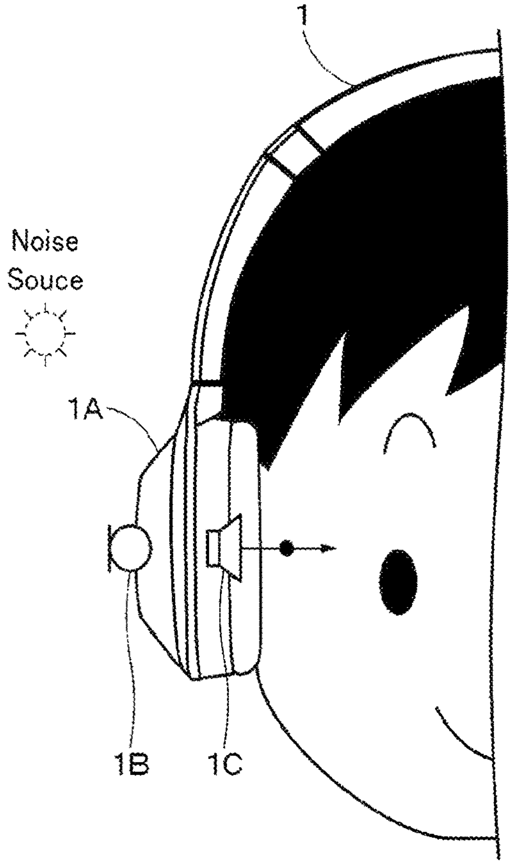
FIGS. 3A and 3B are diagrams each referred to for explaining problems to be considered in the embodiment.

The FF system will be next described. As depicted in FIG. 3A, the FF system is basically a system including the microphone 1B disposed outside the headphone housing 1A, and is intended to perform appropriate filtering for noise collected by the microphone 1B, reproduce the filtered noise using the driver inside the housing, and cancel the noise at a position close to the ear.

Figure 3B:
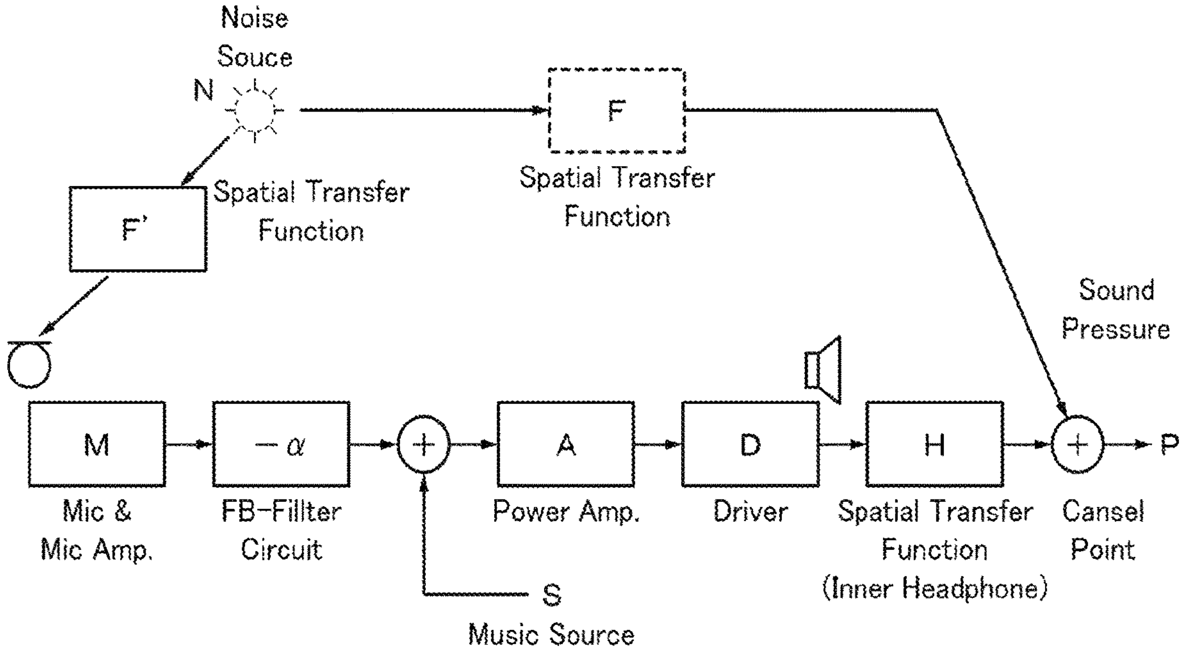

Details of symbols included in FIG. 3B are substantially similar to the corresponding details in the description of FIG. 1B. However, a transfer function to the ear position from the position of the noise N coming from the external noise source is indicated by F. When a filter constituting a core of the FF system here is designated as (−α), a sound pressure P in FIG. 3B can be represented by the following Expression 7. Note that F' in Expression 7 represents a transfer function from the noise source to the microphone position.

(Expression 7)

$$P = -F'ADHM\alpha N + FN + ADHS \quad (7)$$

Here, when the following Expression 8 is adopted on an assumption of an ideal state, (Expression 8)

$$F = F'ADHM\alpha \quad (8)$$

Expression 7 described above can be expressed as the following Expression 9. In this case, the noise N is cancelled, and only a musical signal (or a listening target audio signal or the like) is left. Accordingly, it is obvious that a sound similar to a sound obtained by a normal headphone operation is allowed to be heard.

(Expression 9)

$$P = ADHS \quad (9)$$

In an actual situation, however, a complete filter which has a transfer function completely satisfying Expression 8 is difficult to configure. Particularly, in a middle to high range, this active noise reduction process is not generally performed for the middle to high range due to a large individual difference in attachment and ear shape for each person, a characteristic change in accordance with a noise position, a microphone position, or the like, and for other reasons. Accordingly, passive sound insulation is often adopted using the headphone housing. Note that Expression 8 imitates the transfer function from the noise source to the ear position using an electric circuit including a as obvious from this expression.

Note that a cancel point here can be set at any ear position of the listener as depicted in FIG. 3A unlike the feedback type depicted in FIG. 1A. However, a in an ordinary case is fixed and determined on the basis of a certain target characteristic in a designing stage. Accordingly, a sufficient noise cancelling effect is difficult to obtain depending on persons each having a different ear shape, or a phenomenon such as emission of an abnormal sound may be caused by addition of a noise component in a non-antiphase.

For these reasons, the FF system generally exhibits a low possibility of oscillation and high stability, but has difficulty in obtaining a sufficient level of attenuation. On the other hand, the FB system can be expected to obtain a high level of attenuation, but requires caution for system stability.

Figure 4:
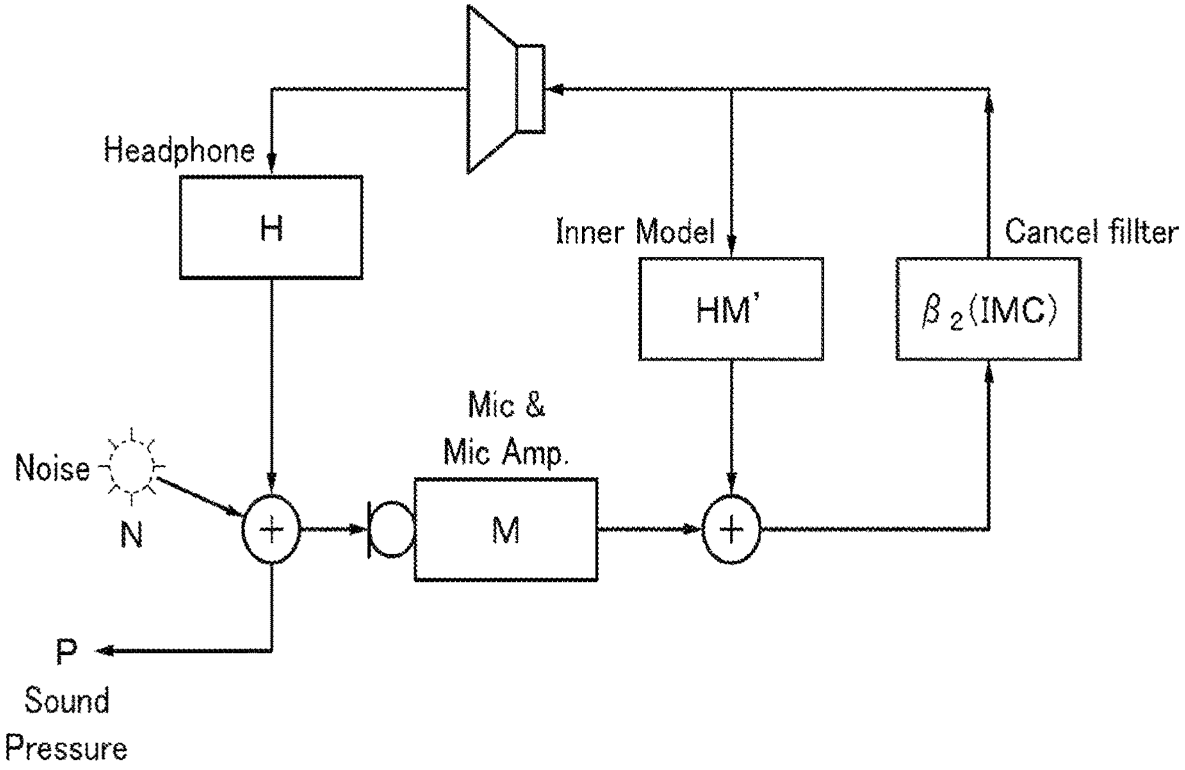
FIG. 4 is a diagram referred to for explaining problems to be considered in the embodiment.

The FB system adopted in FIGS. 1A and 1B will be referred to as BCC (Basic Closed Loop Control) in the following description where appropriate. Moreover, noise cancelling based on the FB system also includes a system using an IMC model as described in PTL 1. FIG. 4 is a block diagram depicting a circuit configuration example to which the system using the IMC model is applied. According to this system, a sound pressure P can be expressed as the following Expression 10.

(Expression 10)

$$P = \frac{(1 + \beta HM')}{1 + \beta(HM' - DHM')}N \quad (10)$$

Note that the FB system, the FF system, and the like may be combined with each other. Moreover, various types of systems associated with noise cancelling described above in PTL 1 are applicable to the present disclosure.

Meanwhile, as described above, oscillation is caused when the open loop (item of βAHM) becomes −1 (0 dB, −180 degrees). As a result, howling is generated. Howling gives discomfort to the user. Accordingly, control for eliminating howling is executed.

In this case, an item H that is included in the open loop and that corresponds to a transfer function in a space from a driver of a headphone to a microphone (e.g., microphone 1C described above) changes depending on an acoustic impedance in a space formed by a head, an earpad, and a housing. Accordingly, the item H changes when an ordinary attachment state (normal attachment state) turns into a different attachment state. For example, when an earpad of a headphone is pressed against a seat during a sleep with the headphone kept attached in an airplane, a train, or the like, the earpad is considerably deformed and changes the item H. As a result, howling may be generated depending on a use situation of the user even if a stable feedback loop characteristic is secured in the normal attachment state.

For handling this howling, considered is such a method that designs a feedback filter in consideration of a margin in such a manner as to specify a possible range of the change of the item H and stabilize the feedback loop characteristic even after a change. This method can prevent generation of howling, but has such a problem that noise cancelling performance decreases in a period of the normal attachment which accounts for substantially a major part of a use period by the user. In consideration of the abovementioned points, the present disclosure maintains noise cancelling performance in the normal attachment state, and reduces noise cancelling performance to an extent not generating howling in an attachment state different from the normal attachment state (hereinafter referred to as an abnormal attachment state where appropriate). One embodiment of the present disclosure will be hereinafter described in detail.

One Embodiment

[Headphone]

Described in the present embodiment will be a case using an overhead-type headphone as an example of an acoustic processing apparatus. Note that the present disclosure is applicable to not only the overhead-type headphone but also an in-ear type earphone.

Figure 5:
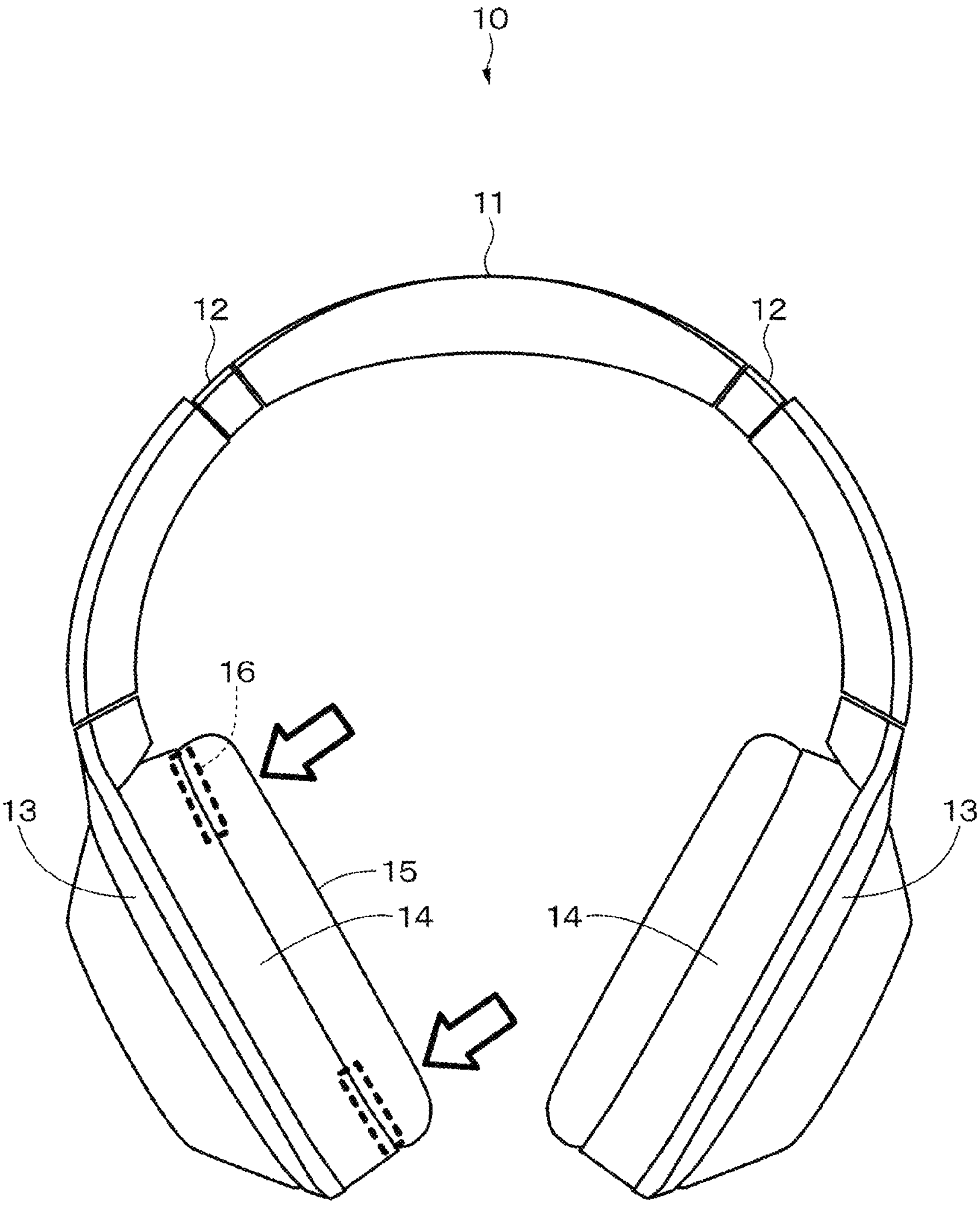
FIG. 5 is a diagram depicting an external appearance example of a headphone according to the present embodiment.

FIG. 5 is a diagram depicting an external appearance example of a headphone (headphone 10) according to the present embodiment. As depicted in FIG. 5, the headphone 10 includes a headband 11, sliders 12, hangers 13, housings 14, and earpads 15, for example.

The headband 11 has a curved shape extending along a head of a wearer, and comes into contact with a parietal region of the wearer in an attachment state to support the whole of the headphone 10. The headband 11 is made of synthetic resin such as plastics or metal, and has predetermined rigidity and elasticity to obtain flexibility. Accordingly, the headband 11 is capable of maintaining the attachment state of the headphone 10 by pressing the housings 14 and the earpads 15 in temporal directions of the wearer during attachment. Note that rubber or the like may be provided as a cushioning material at a portion of contact between an inner surface of the headband 11 and the parietal region of the wearer. Moreover, a hinge may be provided to allow the headphone 10 to be carried in a state folded at the center.

Each of the sliders 12 is provided at a predetermined position in an extension direction of the headband 11. In addition, each of the hangers 13 is attached to an end portion of the corresponding slider 12. Each of the hangers 13 is movable in a direction away from or closer to the headband 11 by the slider 12 being slid along a guide member.

Each of the hangers 13 supports the corresponding housing 14 such that the housing 14 is freely rotatable. For example, each of the hangers 13 supports the corresponding housing 14 using support pins (not depicted) protruding inward from a pair of tips of the hanger 13, to support the housing 14 such that the housing 14 is freely rotatable.

Each of the housings 14 provided as a housing has a storage space inside the housing 14, and stores components such as a driver unit provided as an audio output unit which converts an electric signal into a sound wave and outputs the sound wave. For example, each of the housings 14 is made of synthetic resin such as plastics.

Figure 6:
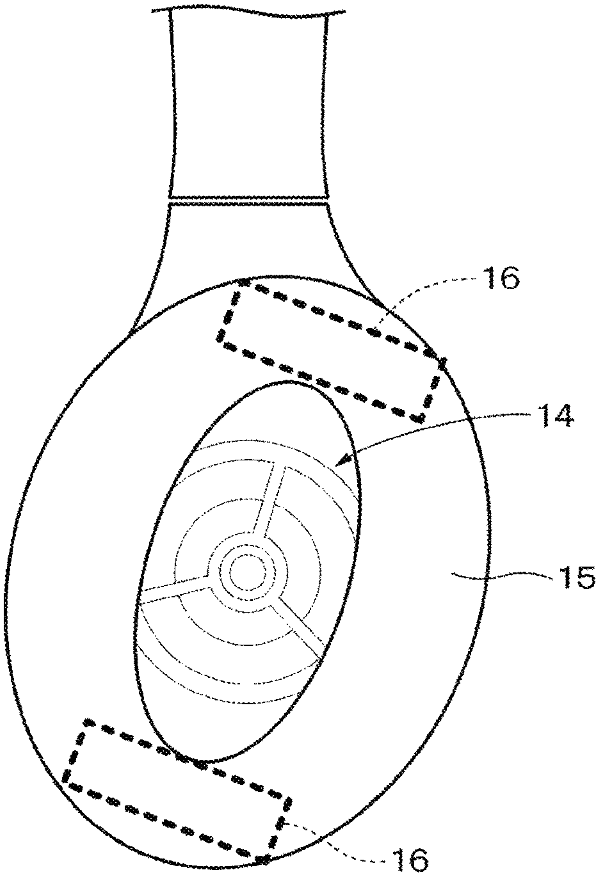
FIG. 6 is a diagram referred to for explaining a configuration example of the headphone according to the present embodiment.

Each of the earpads 15 provided as an example of an attachment unit is provided on a surface of the corresponding housing 14 on a side facing the temporal region of the wearer (see FIG. 6). Each of the earpads 15 is interposed between the housing 14 and the temporal region of the wearer to function as a cushioning member between the housing 14 and the temporal region of the wearer. Each of the earpads 15 prevents direct contact between the housing 14 made of a hard material not easily deformable and the ear and the temporal region of the wearer during attachment of the headphone 10, and generation of discomfort or a pain applied to the wearer. Note that each of the housings 14 and the earpads 15 may constitute the attachment unit.

The headphone 10 according to the present embodiment includes sensors 16 each for detecting deformation of the earpad 15. For example, each of the sensors 16 includes two pressure sensors provided inside the corresponding earpad 15, or on a support portion supporting the corresponding earpad 15. For example, each of the sensors 16 is a film which is deformable by application of pressure and changes a resistance value in accordance with deformation. It is determined whether the headphone 10 is in the normal attachment state, or in the abnormal attachment state on the basis of a voltage output from each of the sensors 16. Specifically, the headphone 10 is determined to be in the normal attachment state when the voltage output from the sensor 16 is equal to or below a threshold. The headphone 10 is determined to be in the abnormal attachment state when the voltage output from the sensor 16 is higher than the threshold.

Figure 7:
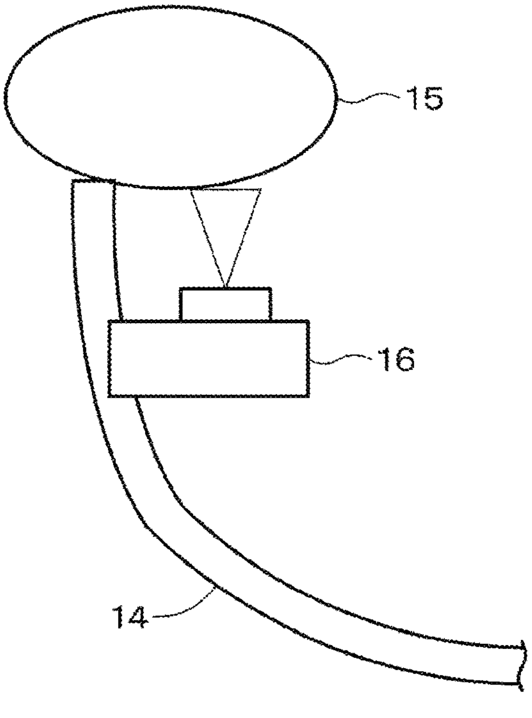
FIG. 7 is a diagram referred to for explaining the configuration example of the headphone according to the present embodiment.
Figure 8:
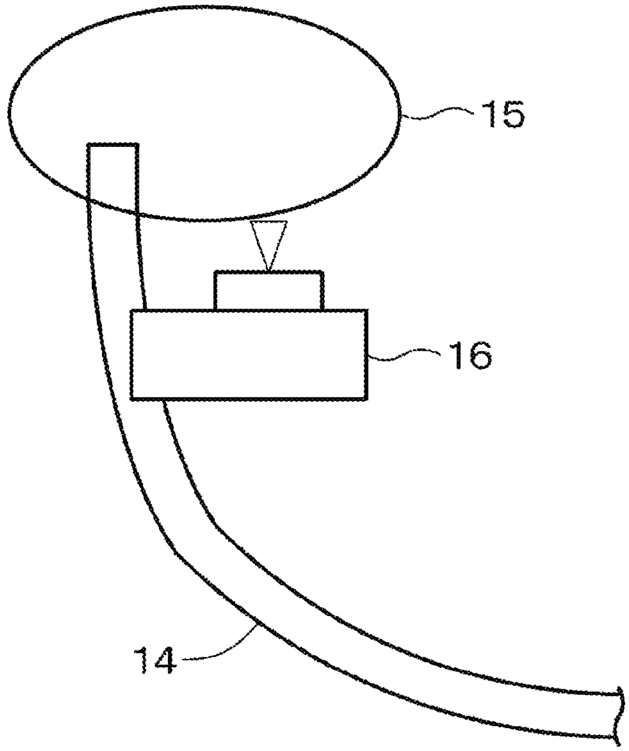
FIG. 8 is a diagram referred to for explaining the configuration example of the headphone according to the present embodiment.

Each of the sensors 16 may be a distance sensor provided on the corresponding housing 14. For example, as depicted in FIG. 7, the headphone 10 is determined to be in the normal attachment state in a case where the distance to the earpad 15 detected by the sensor 16 is longer than a threshold. Moreover, as depicted in FIG. 8, the headphone 10 is determined to be in the abnormal attachment state where the earpad 15 is pushed harder than in the normal attachment state in a case where the distance to the earpad 15 detected by the sensor 16 is equal to or shorter than the threshold. Each of the sensors 16 may be a sensor constituted by a combination of the pressure sensor and the distance sensor described above, or may be a sensor of another type. While only a part (only one side) of the configuration of the headphone 10 is depicted in each of FIGS. 7 and 8, the headphone 10 may include the distance sensor or the like for the earpad 15 on the opposite side of the headphone 10.

[Internal Configuration Example]

(Internal Configuration Example of Headphone)

Figure 9:
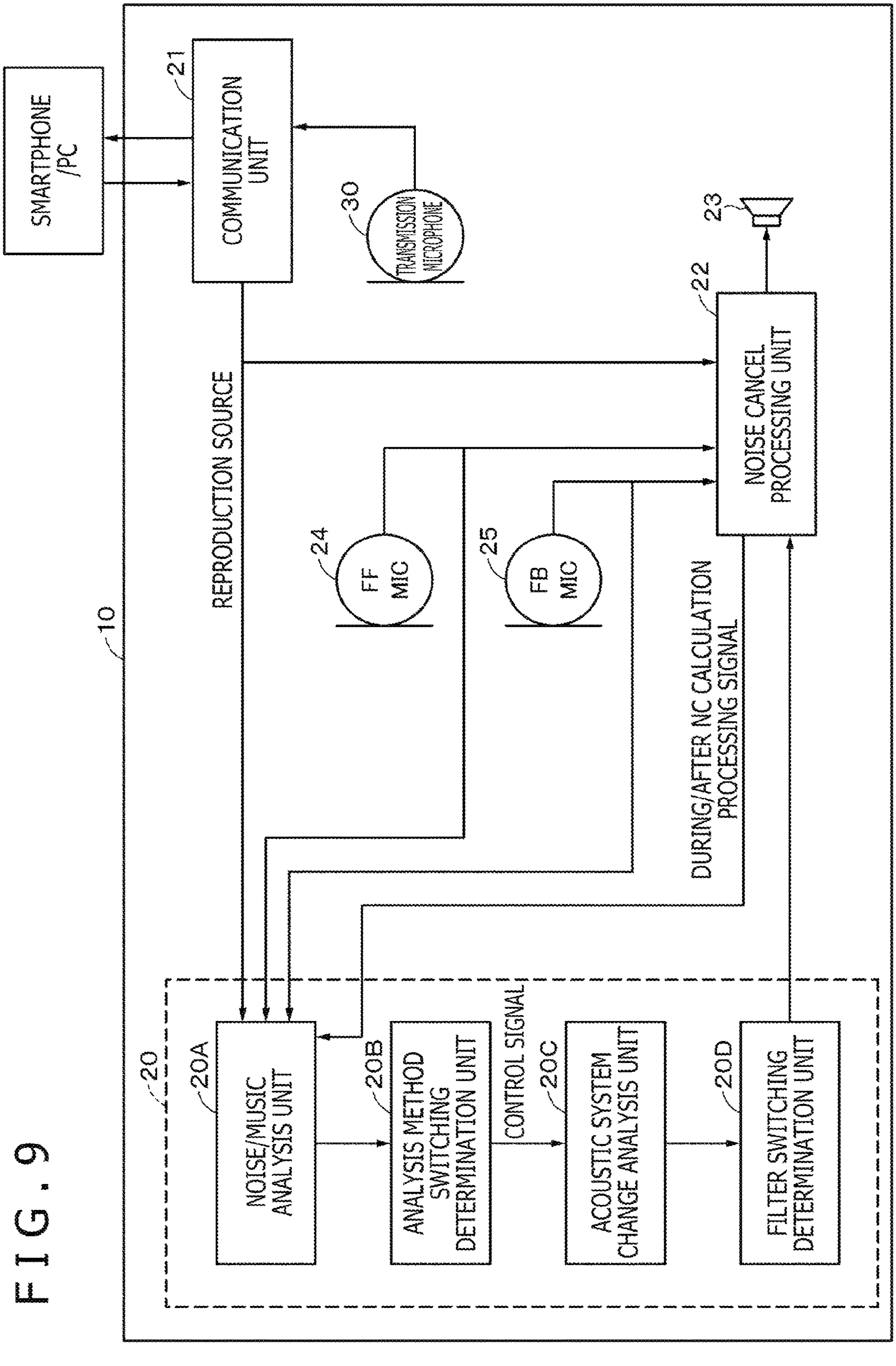
FIG. 9 is a diagram depicting an internal configuration example of the headphone according to the present embodiment.

FIG. 9 is a block diagram depicting an internal configuration example of the headphone 10 according to the present embodiment. For example, the headphone 10 includes a control unit 20, a communication unit 21, a noise cancel processing unit 22, a speaker 23, an FF microphone 24 which is a microphone for performing noise cancelling based on the FF system, an FB microphone 25 which is a microphone for performing noise cancelling based on the FB system, and a transmission microphone 30. The control unit 20 includes a noise/music analysis unit 20A, an analysis method switching determination unit 20B, an acoustic system change analysis unit 20C, and a filter switching determination unit 20D. Note that the foregoing configuration is basically provided for each of left and right channels of the headphone 10. However, a part of the configuration may be a common part shared by the left and right channels.

The communication unit 21 communicates with a smartphone, a personal computer, or the like to acquire a music signal corresponding to a reproduction source. This communication may be either wireless communication or wired communication. The music signal acquired by the communication unit 21 is supplied to the noise/music analysis unit 20A.

The control unit 20 switches a mode for noise cancelling in accordance with a result of deformation detection of the earpads 15. More specifically, the control unit 20 switches the mode for noise cancelling in accordance with a transfer function of a sound that is emitted from the speaker and arrives at the microphone for feedback. For example, the mode for noise cancelling includes a mode for providing a certain level of noise cancelling performance or higher (a mode for raising a loop gain of feedback), and a mode for providing a certain level of noise cancelling performance or lower (a mode for lowering a loop gain of feedback).

The noise/music analysis unit 20A analyzes a plurality of signals input to itself (hereinafter referred to as a signal group where appropriate). Thereafter, the noise/music analysis unit 20A supplies an analysis result to the analysis method switching determination unit 20B. Examples of the signal group include signals acquired by the FF microphone 24, signals acquired by the FB microphone 25, signals in the middle of processing by the noise cancel processing unit 22 (both a part or the whole of these signals), and signals processed by the noise cancel processing unit 22.

The analysis method switching determination unit 20B selects a detection signal for detecting a change of the item H (more specifically, item HM) of the open loop described above in accordance with the analysis result, and specifies an algorithm for determining a change of HM on the basis of the selected detection signal.

The acoustic system change analysis unit 20C detects a change of HM using the detection signal and the algorithm selected by the analysis method switching determination unit 20B. The change of HM detected by the acoustic system change analysis unit 20C is supplied to the filter switching determination unit 20D.

The filter switching determination unit 20D generates a control signal for switching a characteristic of a filter on the basis of the change of HM supplied from the acoustic system change analysis unit 20C. The control signal generated by the filter switching determination unit 20D is supplied to the noise cancel processing unit 22 to switch a characteristic of a filter included in the noise cancel processing unit 22. The filter whose characteristic is to be switched includes at least a filter for performing FB system noise cancelling (feedback filter) as described in detail below. The filter whose characteristic is to be switched may include a filter for performing FF system noise cancelling (feedforward filter). Moreover, a characteristic of an equalizer performing an equalizing process for a music signal may be switched. Switching of the characteristic of the filter includes switching of the filter to be used, changing a parameter (specifically, a gain) of the filter, and others. Further, at the time of switching of the characteristic of the filter, a known process (fade-in and fade-out process and the like) may be performed to prevent a rapid change of the music signal to be reproduced.

Note that the control unit 20 may perform known control associated with processing other than the processing described above.

The noise cancel processing unit 22 performs a noise cancelling process by using a method described below. A signal noise-cancelled by the noise cancel processing unit 22 is reproduced from the speaker 23.

Figure 10:
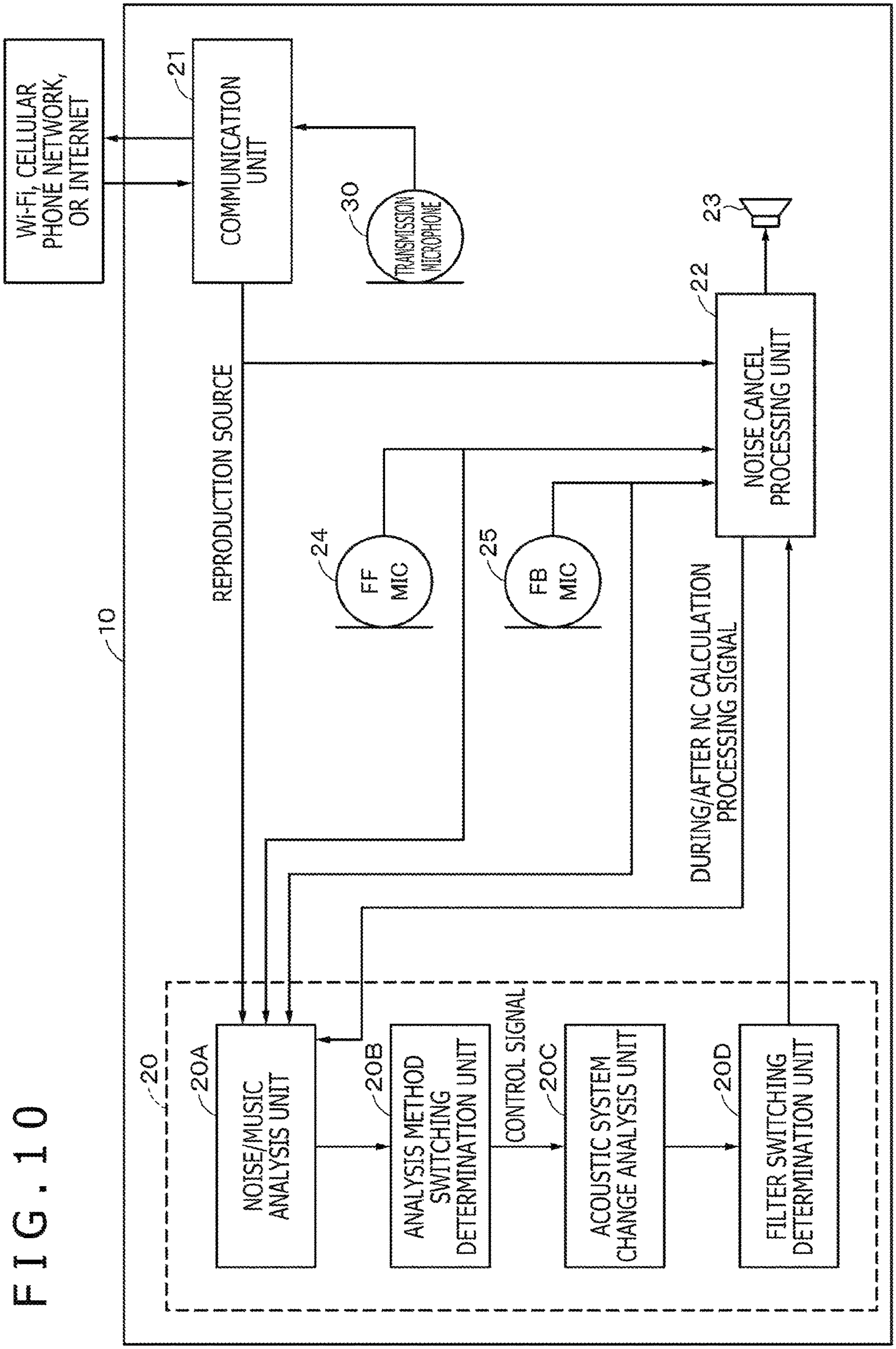
FIG. 10 is a diagram depicting another internal configuration example of the headphone according to the present embodiment.

Note that the source supplied from the external device to the headphone 10 may be a signal other than the music signal. For example, in a case where the acoustic processing apparatus of the present disclosure is applied not to the headphone but to a calling device such as a smartphone, the communication unit 21 communicates with another communication device via wireless communication as depicted in FIG. 10. Examples of the wireless communication include a LAN (Local Area Network), Bluetooth (registered trademark), Wi-Fi (registered trademark) or WUSB (Wireless USB), a cellular phone network, and the Internet. In addition, the noise cancelling process may be performed for a signal for calling other than a music signal transmitted from the external device and acquired by the communication unit 21. Moreover, the noise cancelling process may be performed by the noise cancel processing unit 22 for a voice signal input from the user to the transmission microphone 30, and the noise-cancelled voice signal may be transmitted to an external device such as a smartphone via the communication unit 21.

The FF microphone 24 is provided outside the housing 14. Moreover, the FB microphone 25 and the speaker 23 are provided inside the housing 14.

(Internal Configuration Example of Noise Cancel Processing Unit)

An internal configuration example of the noise cancel processing unit 22 will be next described with reference to FIG. 11. For example, the noise cancel processing unit 22 includes a filter circuit 221, an adder 222, a subtracter 223, a filter circuit 224, an adder 225, an adder 226, and a characteristic giving unit 227.

The filter circuit 224 includes a filter circuit 224A and a filter circuit 224B. As described above, switching between the filter circuit 224A and the filter circuit 224B is achieved under control by the control unit 20. Note that $\alpha$, $\beta_1$, and $\beta_2$ in FIG. 11 represent parameter gains of the filter circuit 221, the filter circuit 224A, and the filter circuit 224B, respectively. These parameter gains are stored in a memory (not depicted) included in the control unit 20, for example. Note that $\beta_1<\beta_2$ holds between the parameter gain $\beta_1$ of the filter circuit 224A and the parameter gain $\beta_2$ of the filter circuit 224B according to the present embodiment. Noise cancelling performance increases as the open loop ($-\beta HM$) becomes higher (larger). Accordingly, noise cancelling performance more increases in a case of use of the filter circuit 224B than in a case of use of the filter circuit 224A. On the other hand, the system of the feedback loop becomes unstable when $\beta HM$ increases to a certain level or higher. In this case, howling is easily generated. Accordingly, the filter circuit 224A needs to be used in a situation where howling is likely to be generated.

Figure 11:
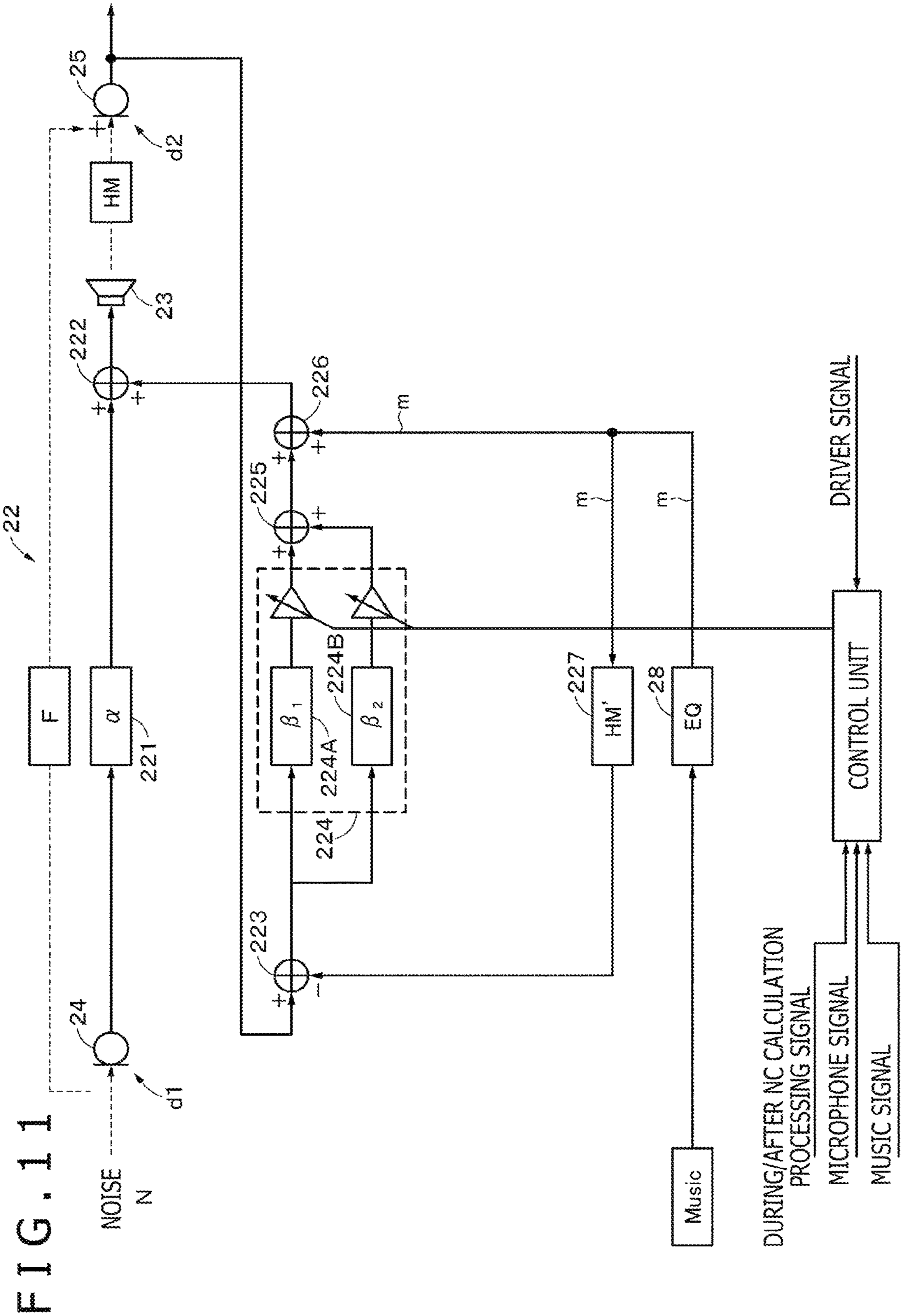
FIG. 11 is a diagram referred to for explaining a configuration example of a noise cancel processing unit according to the present embodiment.

Moreover, N in FIG. 11 is noise emitted from a noise source and reaching the FF microphone 24, d1 (disturbance 1) is noise generated by rubbing the FF microphone 24 with a finger or blowing in wind, for example, and F is a transfer function from the FF microphone 24 to the FB microphone 25. Specifically, F represents a transfer function of noise leaking into the interior of the headphone (ear side), and includes a sound transmitted through the earpad 15 (or earpiece in a certain configuration), and further a characteristic of an acoustic transmission path within the housing, for example. Moreover, HM represents a transfer function of a sound emitted from the driver until collection by the FB microphone 25. In addition, d2 represents an impact sound during walking, or a sound produced by tapping the headphone, for example. Further, m in FIG. 11 is a sound reproduced from the headphone and to be heard by the wearer, such as music and a call voice, and corresponds to a music signal in the present embodiment. An equalizing process is performed for the music signal by the equalizer (EQ) 28. The signal obtained by the equalizing process is expressed as a music signal m.

Noise produced by the noise N emitted from the noise source is collected by the FF microphone 24 and output to the filter circuit 221 as a noise signal. The filter circuit 221 performs a noise cancelling process of the feedforward system on the basis of the noise signal, and outputs a noise cancel signal to the adder 222. The adder 222 sums up output of the filter circuit 221 and output of the adder 226 (noise cancel signals), and outputs the sum to the speaker 23.

A sound reproduced by the speaker 23 is collected by the FB microphone 25 via a transfer function H. An output of the FB microphone 25 is supplied to the subtracter 223. The subtracter 223 subtracts an output of the characteristic giving unit 227 from the output of the FB microphone 25. The subtracter 223 outputs a signal obtained after the subtraction to the filter circuit 224.

The filter circuit 224 performs a predetermined filtering process for the signal output from the subtracter 223, to generate a noise cancelling signal for cancelling external noise reaching the ears of the user. The filter circuit 224 controls a gain, a phase, and an amplitude characteristic of the signal output from the subtracter 223 using the parameter gain $\beta_1$ or $\beta_2$. The filter circuit 224 may include an FIR filter, or an IIR filter, for example. The adder 225 sums up output of the filter circuit 224A and output of the filter circuit 224B. Note that the output of either one of these filter circuits corresponds to the output of the adder 225 in a case where only the corresponding one filter circuit is used. The adder 226 sums up the music signal m and the output of the adder 225 including the noise cancelling signal. The output of the adder 226 is supplied to the adder 222.

The characteristic giving unit 227 gives HM' as a predetermined characteristic to the music signal m. This characteristic HM' which is the predetermined characteristic is HM corresponding to the normal attachment state, and is set beforehand (modeled). An output of the characteristic giving unit 227 is supplied to the subtracter 223. Accordingly, the output of the subtracter 223 ideally becomes 0 when the headphone 10 is in the normal attachment state. On the other hand, deviation of HM (hereinafter referred to as ΔHM where appropriate) is detected when the headphone 10 is in the abnormal attachment state.

Figure 12:
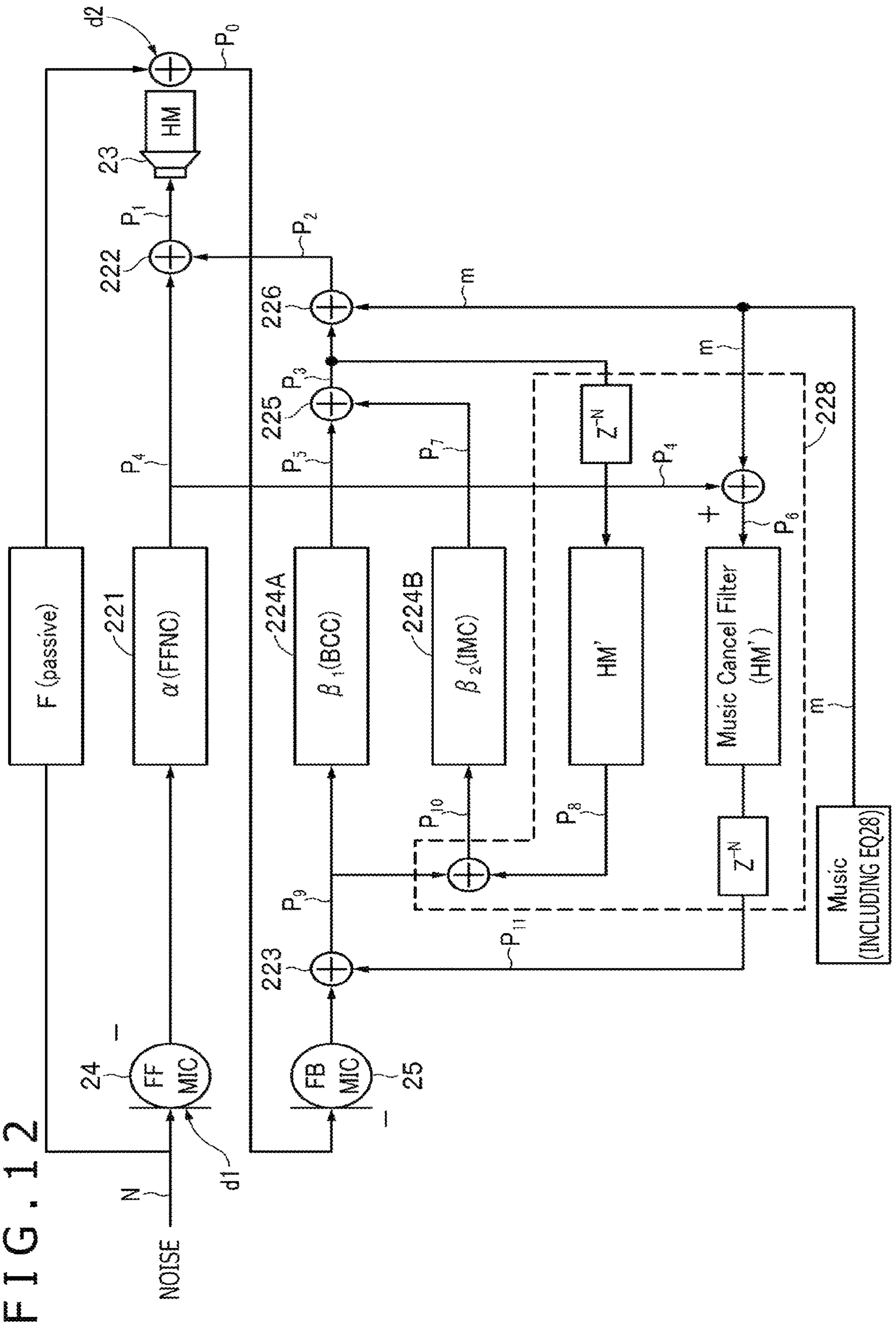
FIG. 12 is a diagram referred to for explaining the configuration example of the noise cancel processing unit according to the present embodiment.

The noise cancel processing unit 22 may have a configuration depicted in FIG. 12. Specifically, the configuration of the characteristic giving unit 227 is replaced with a ΔHM detection unit 228 depicted in FIG. 12. Note that a signal of $P_0$ is considered to be the sum of N in which F is convoluted and d2 (disturbance 2) on an assumption that $P_0$ is a sound entering the FB microphone 25 in FIG. 12. A signal of $P_1$ in FIG. 12 is a sound finally input to the headphone driver via a DAC (Digital Analog Converter) and a headphone amplifier. In addition, Px ($P_2$ to $P_8$ in this example) is a sound as an intermediate result calculated in the middle of the noise cancelling process.

The headphone 10 selects $P_x$ where ΔHM is easily observable as necessary. Thereafter, a formula indicating the selected signal is solved to detect ΔHM. In the case of the noise cancel processing unit 22 depicted in FIG. 12, the signal of $P_x$ can be expressed using an expression presented in FIG. 13. Each of FIGS. 14 and 15 presents a result obtained by solving simultaneous expressions for respective points $P_x$. Moreover, FIG. 16 presents a table where the results presented in FIGS. 14 and 15 are sorted for each item. A change of HM is detected using one or a plurality of points $P_x$ where a change of N, which is external noise, or the music signal m, both produced in accordance with a change of HM (ΔHM), is easily detectable in FIG. 16. A characteristic of a filter or the like used for the noise cancelling process is switched in accordance with the change of HM.

One of examples of this switching is switching of a detection signal for detecting ΔHM in accordance with a level of power of the music signal m and a level of noise. For example, as depicted in FIG. 17, four quadrants (patterns) are set in accordance with the level of power of the music signal m and the level of noise. Pattern 1 is a pattern which contains the high power music signal m and loud noise. Pattern 2 is a pattern which contains the low power music signal m but loud noise. Pattern 3 is a pattern which contains the high power music signal m but low noise. Pattern 4 is a pattern which contains the low power music signal m and low noise.

Each of the points $P_x$ can be expressed by the sum of
- a transfer function associated with the music signal m
- Nf+d2, i.e., a transfer function associated with noise leaking into the interior of the headphone 10
- N+d1, i.e., a transfer function associated with input of the FF microphone 24

(see FIG. 16). It is therefore concluded that a degree of an influence on the signal appearing in $P_x$ by the change of HM changes in accordance with a frequency amplitude phase characteristic of the music signal m or the noise N, e.g., power in a frequency band used for detection of ΔHM (sound volume or energy).

In the case of Pattern 1, $P_0$, the music signal m, and $P_9$ are used as detection signals (this point will be described below in detail).

In Pattern 2, for example, assumed is such a case where noise is only desired to be reduced without listening to music in a state where the wearer of the headphone 10 is in a noisy condition produced by an airplane or the like, specifically, an example where the headphone 10 is used as earplugs or earmuffs. In this case, an item associated with the music signal m is negligibly small, and $P_x$ subjected to a change of HM in an item associated with noise M is used as a detection signal. In a simplest example, a transfer function representing a noise reduction level is observable by dividing $P_0$ by N. Needless to say, the noise reduction level changes in accordance with HM. Accordingly, a change of HM is detectable on the basis of deviation from a threshold of the noise reduction level specified beforehand.

In the case of Pattern 3, the influences of items of Nf+d2 and N+d1 in $P_x$ are small, and the influence of the transfer function associated with the music signal m is dominant. In this case, the following Expression 11 remains by calculation of $P_{10}/P_0$, for example.

(Expression 11)

$$\left(1-\frac{HM_z'^{-N}}{HM}\right) \quad (11)$$

The following Expression 12

(Expression 12)

$$HM_Z'^{-N} \quad (12)$$

in Expression 11 is designed on the basis of approximation of HM in the normal attachment state. Accordingly, $P_{10}/P_0$ approaches 0 when a modelling error is small in the normal attachment state. The value increases as the modelling error becomes larger by a change of HM. Accordingly, a change of HM is detectable if a fixed threshold is defined. Note that the power observed by $P_{10}/P_0$ is dependent on the music signal m at the time of comparison with the threshold in an actual situation. Accordingly, normalization may be achieved using the music signal m. Specifically, in the case of Pattern 3, $P_0$ and $P_{10}$ (or $P_0$, $P_{10}$, and music signal m) are used as detection signals, for example.

In the case of Pattern 4, a detection signal may not be generated, or may be hidden in d1 or d2. In this case, a change of HM is difficult to detect even by use of any signal. Accordingly, in the case of Pattern 4, a filter having no risk of howling (the filter circuit 224A according to the present embodiment) is always used.

Note that the four quadrants (four patterns) described above are not necessarily required to be adopted. However, division into at least two quadrants (two patterns) is made, and a detection signal is appropriately set for each of the patterns.

[Operation Example of Headphone]

An operation example of the headphone 10 will be next described. As described above, ΔHM (a change of a transfer function) is detected as deviation between HM' modeled on an assumption of the normal attachment state of the headphone 10 and actual HM. A value of ΔHM which is a certain value or larger indicates that the current state is not the normal attachment state but the abnormal attachment state. In the abnormal attachment state, HM increases and easily causes howling. According to the headphone 10 of the present embodiment, therefore, the filter circuit 224A is used in a case where HM is out of a predetermined range at a value of ΔHM which is a certain value or larger, i.e., in a case where the attachment state of the headphone 10 is the abnormal attachment state. In this manner, generation of howling is prevented. Moreover, the filter circuit 224B is used in a case where HM falls within the predetermined range at a value of ΔHM which is the certain value or smaller, i.e., in a case where the attachment state of the headphone 10 is the normal attachment state. In this manner, a certain level of performance of the noise cancelling process or higher is secured.

FIG. 18 is a figure which presents a summary of the foregoing operation example. The attachment state of the headphone 10 is assumed to include the normal attachment state and the abnormal attachment state. In the normal attachment state, ΔHM decreases. Accordingly, HM becomes a value lower than the value of HM in the abnormal attachment state. In the normal attachment state, a filter circuit having a large parameter gain, specifically, the filter circuit 224B having the parameter gain $\beta_2$, is used. In this case, the open loop (−βHM) becomes a loop obtained by multiplying low HM by a high parameter gain, and can thus be lowered to a certain level or lower. Accordingly, generation of howling is avoidable while noise cancelling performance is secured. Note that "0" is set as a flag indicating a risk of generation of howling (Howling_Predict) in the case of the normal attachment state.

In the abnormal attachment state, ΔHM increases. Accordingly, HM becomes a high value. In the abnormal attachment state, a filter circuit having a small parameter gain, specifically, the filter circuit 224A having the parameter gain $\beta_1$ is used. In this case, the open loop (−βHM) becomes a loop obtained by multiplying high HM by a low parameter gain, and can thus be lowered to a certain level or lower. Accordingly, noise cancelling performance is limited to a certain level or lower, but generation of howling is avoidable. Discomfort given to the user as a result of generation of howling is thus preventable. Note that "1" is set as a flag indicating a risk of generation of howling (Howling_Predict) in the case of the abnormal attachment state.

In such a manner, the characteristic of the filter is appropriately switchable in accordance with whether or not the current situation is a situation where howling is likely to be generated. Moreover, in an environment where howling is unlikely to be generated, a certain level of noise cancelling performance or higher can be secured. Accordingly, it is unnecessary to constantly lower noise cancelling performance (constantly using the filter circuit 224A having the parameter gain $\beta_1$) in consideration of a risk of howling generated by the abnormal attachment state of the headphone 10 to constantly reduce the noise cancelling performance.

Note that ΔHM is detected in a signal processing manner in the example described above. However, ΔHM may be detected on the basis of a detection result obtained by the sensor 16. For example, a table which describes sensing data obtained by the sensor 16 and ΔHM in association with each other is prepared. ΔHM corresponding to the sensing data obtained by the sensor 16 may be acquired using this table.

[Processing Examples Performed by Headphone]

Described next will be a plurality of processing examples executable using the headphone 10 according to the present embodiment. Note that the headphone 10 may perform only one of the multiple processes described hereinafter, or may perform the plurality of processes while switching the processes as necessary.

In the respective processing examples, a mode using the filter circuit 224A will be referred to as a safe mode where appropriate. Moreover, a mode using the filter circuit 224B will be referred to as a turbo mode where appropriate. Further, (Howling_Predict) represents a status indicating whether or not a risk of howling is present. In a case where (Howling_Predict) is "0," the turbo mode is set. In a case where (Howling_Predict) is "1," the safe mode is set. Values of (Howling_Predict) are not limited to two values, but may be continuous values or the like. In addition, (Howling_Predict) does not necessarily reflect only a change of HM, but may reflect low reliability of a detection process in a state of low power of noise or music in some cases.

Moreover, the present process is repeated in a time axis direction from moment to moment. A variable for storing a history of a filter currently used is set on the basis of a previous determination result. This variable is represented as "State." A state where "State" is "0" indicates the safe mode, while a state where "State" is "1" indicates the turbo mode. Moreover, when the safe mode and the turbo mode are frequently switched, the user may feel uncomfortable as a result of a frequent change in a cancelling effect and sound quality. Accordingly, a counter for counting an elapsed time from issue of a filter change instruction is provided. This counter is represented as "timer." Note that presented hereinafter will be description using the configuration example of the noise cancel processing unit 22 depicted in FIG. 12.

First Processing Example

Figure 19:
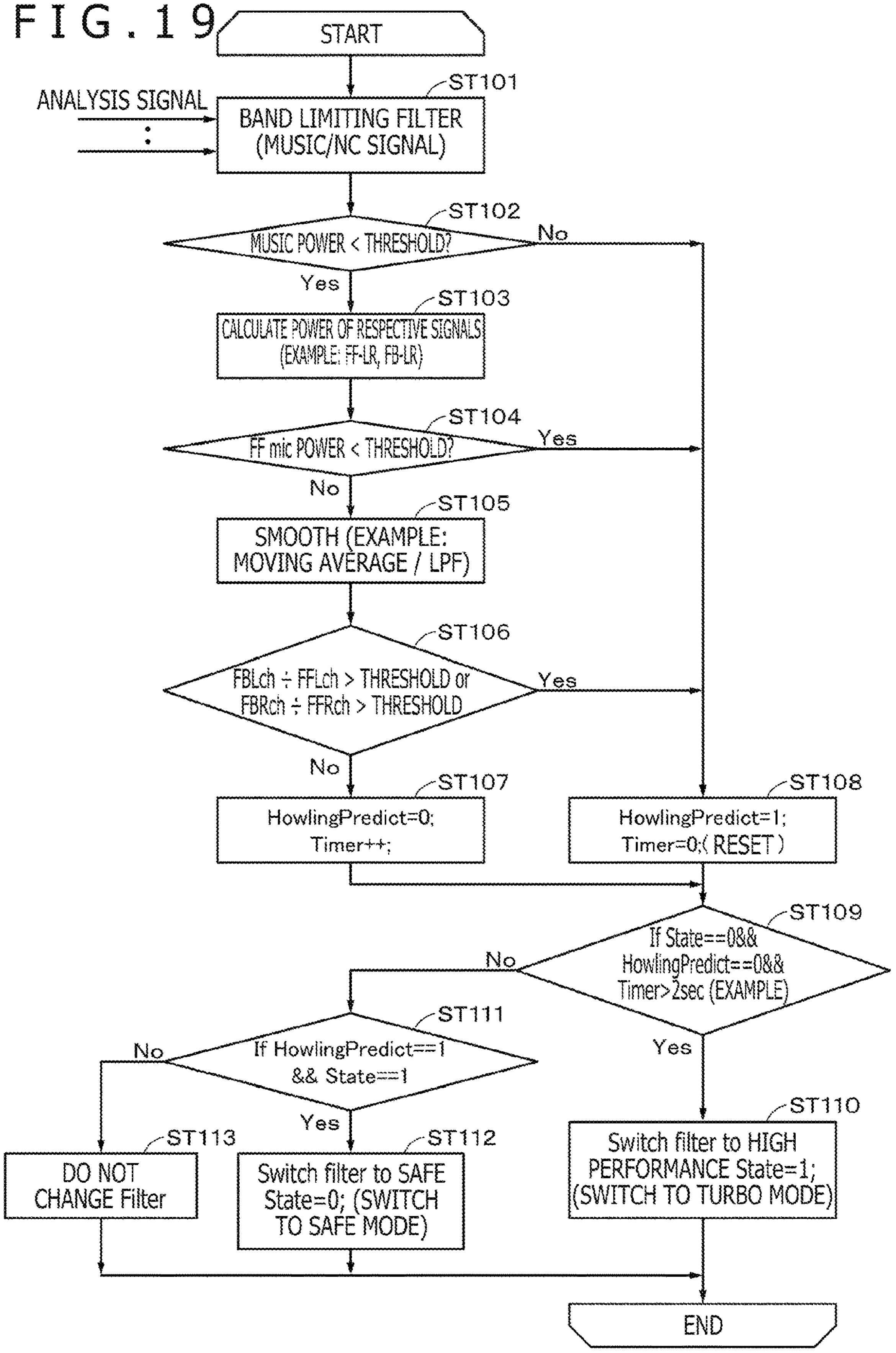
FIG. 19 is a flowchart referred to for explaining a first processing example executable by the headphone according to the present embodiment.

Initially, a process performed in a first processing example executable by the headphone 10 will be specifically described with reference to a flowchart depicted in FIG. 19. In the first processing example, the turbo mode is set only in a case of Pattern 2 where howling is likely to be generated, and the safe mode is set in the other patterns. The process described hereinafter is performed under control by the control unit 20 unless specified otherwise.

For example, the first processing example is started when the headphone 10 is powered on. In addition, in a case where disablement of the noise cancelling function is allowed to be set for the headphone 10, the first processing example is performed while this disablement is not set, in other words, in a case where the noise cancelling function is enabled. A repeating cycle of the first processing example may be a cycle of sample processing performed for each sampling frequency, or a cycle of frame processing performed after buffering for several tens of milliseconds.

In step S101, an analysis signal is input to the control unit 20. The analysis signal here refers to a signal (N+d1) collected by the FF microphone 24, a signal ($P_0$) collected by the FB microphone 25, the music signal m, or each of signals at the respective points $P_x$. Note that a detection signal for detecting ΔHM is set from the analysis signal. Needless to say, only the detection signal may be input to the control unit 20 in step S101.

Note that a band limiting process may be performed using a band limiting filter in step ST101. Energy in the entire range of signals may be used. However, when band limitation is applied, processing target signals can be limited to signals in a band easily influenced by a change of HM. In this case, accuracy of detecting a change of HM improves. Thereafter, the process proceeds to step ST102.

In step ST102, power of the music signal m is analyzed. Thereafter, it is determined whether or not the power of the music signal m is lower than a predetermined threshold. This determination process is performed by the noise/music analysis unit 20A. In a case where the result of the determination process is Yes, the process proceeds to step ST103. In a case where the result of the determination process is No, the process proceeds to step ST108.

In step ST103, power of signals of sounds collected by the left and right FF microphones 24 of the headphone 10 and power of signals ($P_0$ on the left and right) of sounds collected by the left and right FB microphones 25 of the headphone 10 are calculated. This calculation process is performed by the noise/music analysis unit 20A. Thereafter, the process proceeds to step ST104.

In step ST104, it is determined whether or not the power of the signals of the sounds collected by the FF microphones 24 is lower than a predetermined threshold. This determination process is performed by the noise/music analysis unit 20A. In a case where the result of the determination process is No, the process proceeds to step ST105. In a case where the result of the determination process is Yes, the process proceeds to step ST108. Note that the power of the signals of the sounds collected by the FB microphones 25 may be used instead of the power of the signals of the sounds collected by the FF microphones 24 in the determination process in step ST104. In a case where the determination result in step ST104 is Yes, the process proceeds to step ST108 in consideration of erroneous detection or detection omission. In this step, "1" is set as (Howling_Predict).

The pattern where the process proceeds to step ST105 corresponds to a pattern of the low power music signal m and high power noise, i.e., Pattern 2 in the four patterns (see FIG. 17). Accordingly, the analysis method switching determination unit 20B sets, for example, the signals of the sounds collected by the FF microphone 24 and the signals ($P_0$) of the sounds collected by the FB microphone 25 as the detection signals.

In step ST105, power excessively changes from moment to moment in a case of signals generated from noise. Accordingly, smoothing is performed in a time direction. Smoothing is performed by using a moving average, a low-pass filter, or the like. This process may be achieved by either the control unit 20 or other function blocks. Thereafter, the process proceeds to step ST106.

In step 106, the acoustic system change analysis unit 20C calculates a power ratio of the signal of the sound collected by the L (Left) side FB microphone 25 to the signal of the sound collected by the L side FF microphone 24, or a power ratio of the signal of the sound collected by the R (Right) side FB microphone 25 to the signal of the sound collected by the R side FF microphone 24, to calculate ΔHM which is a change of a transfer function on the basis of the calculated power ratios. A calculation result of ΔHM is supplied to the filter switching determination unit 20D, and is compared with a predetermined threshold to determine a risk of generation of howling. In a case where the result of step ST106 is Yes, the process proceeds to step ST108. In a case where the determination result of step ST106 is No, the process proceeds to step ST107.

In step ST107, "0" is set as "Howling_Predict" in consideration that the current environment is an environment where howling is unlikely to be generated. Thereafter, a time of continuation of the turbo mode is counted (timer++).

As described above, the safe mode is set in the patterns other than Pattern 2 in the first processing example. Accordingly, in the case where the current pattern corresponds to the pattern other than Pattern 2 (in the case where the determination result in step ST102 is No (in a case of Pattern 1 or 3) or in the case where the determination result in step ST104 is Yes (in the case of Pattern 4)), the process proceeds to step ST108. In this step, "1" is set as "Howling-Predict" to set the safe mode. Thereafter, the timer is reset. Moreover, in a case where the determination result in step ST106 is Yes, it is determined that a risk of generation of howling is high on the basis of the detection result of ΔHM. Accordingly, the process proceeds to step ST108, and "1" is set as "Howling_Predict" to set the safe mode. Thereafter, the timer is reset.

After completion of processing in steps ST107 and ST108, the process proceeds to step ST109. In a case where the current setting is the turbo mode, the mode needs to be promptly switched to the safe mode to avoid howling. On the other hand, no problem occurs even if the safe mode is slowly switched to the turbo mode. Accordingly, in the present embodiment, for example, switching from the turbo mode to the safe mode is achieved with a raised time constant of cross-fading, while switching from the safe mode to the turbo mode is achieved with a lowered time constant. This manner is adopted because an abnormal sound may be generated by constant switching with a raised time constant. Moreover, when the mode is frequently switched, the user may recognize a change in the level of noise cancelling or a change in the sound quality, and may feel strangeness. Accordingly, a frequent mode change is unpreferable. From these viewpoints, the mode of noise cancelling to be set next is determined in consideration of the previous determination result (the mode currently set) or an elapsed time from switching. Processing in step ST109 and after this step will be hereinafter described.

In step ST109, it is determined whether or not the current mode is the safe mode (State==0), no (or low) risk of generation of howling (Howling_Predict==0), and whether or not a certain time (e.g., two seconds of timer) has elapsed from switching to the previous turbo mode. When the determination result in step ST109 is Yes, the process proceeds to step ST110. When the determination result in step ST109 is Yes, the process proceeds to step ST111.

In step ST110, the risk of generation of howling is low. Accordingly, the mode is switched from the safe mode to the turbo mode. Specifically, the filter used for the noise cancelling process is switched from the filter circuit 224A to the filter circuit 224B. As described above, this process is performed utilizing the fact that relatively free transition is allowed from the safe mode to the turbo mode. Accordingly, timer and State are not necessarily required. The filter is switchable on the basis of only the determination result of the current mode. After completion of processing in step ST110, the loop of the process returns to the beginning.

In step ST111, a risk of generation of howling is predicted (Howling_Predict==1), and whether or not the turbo mode has been adopted as the current mode (State==1) are determined. When the determination in step ST111 is Yes, the process proceeds to step ST112. When the determination in step ST111 is No, the process proceeds to step ST113.

In step ST112, a risk of generation of howling is present, and the current mode is the turbo mode. Accordingly, the mode needs to be promptly switched to the safe mode. Accordingly, the filter circuit used for the noise cancelling process is switched from the filter circuit 224B to the filter circuit 224A. After completion of processing in step ST112, the loop of the process returns to the beginning.

In step ST113 (other cases), the filter need not be switched. Accordingly, the loop of the process returns to the beginning. Thereafter, the process for predicting a risk of generation of howling is repeated.

Note that the correlations and the thresholds in the respective processes described above are appropriately set in accordance with a physical or acoustic structure of the headphone 10. Moreover, the filter is switchable independently for each of the left and right channels. However, when noise cancelling is intensely or weakly applied to only one of the ears, different tones of noise or music may be emitted from the left and the right. Accordingly, in a case where howling is predicted for either one of the channels, the channels on both the sides are switched in the present embodiment.

Second Processing Example

Figure 20:
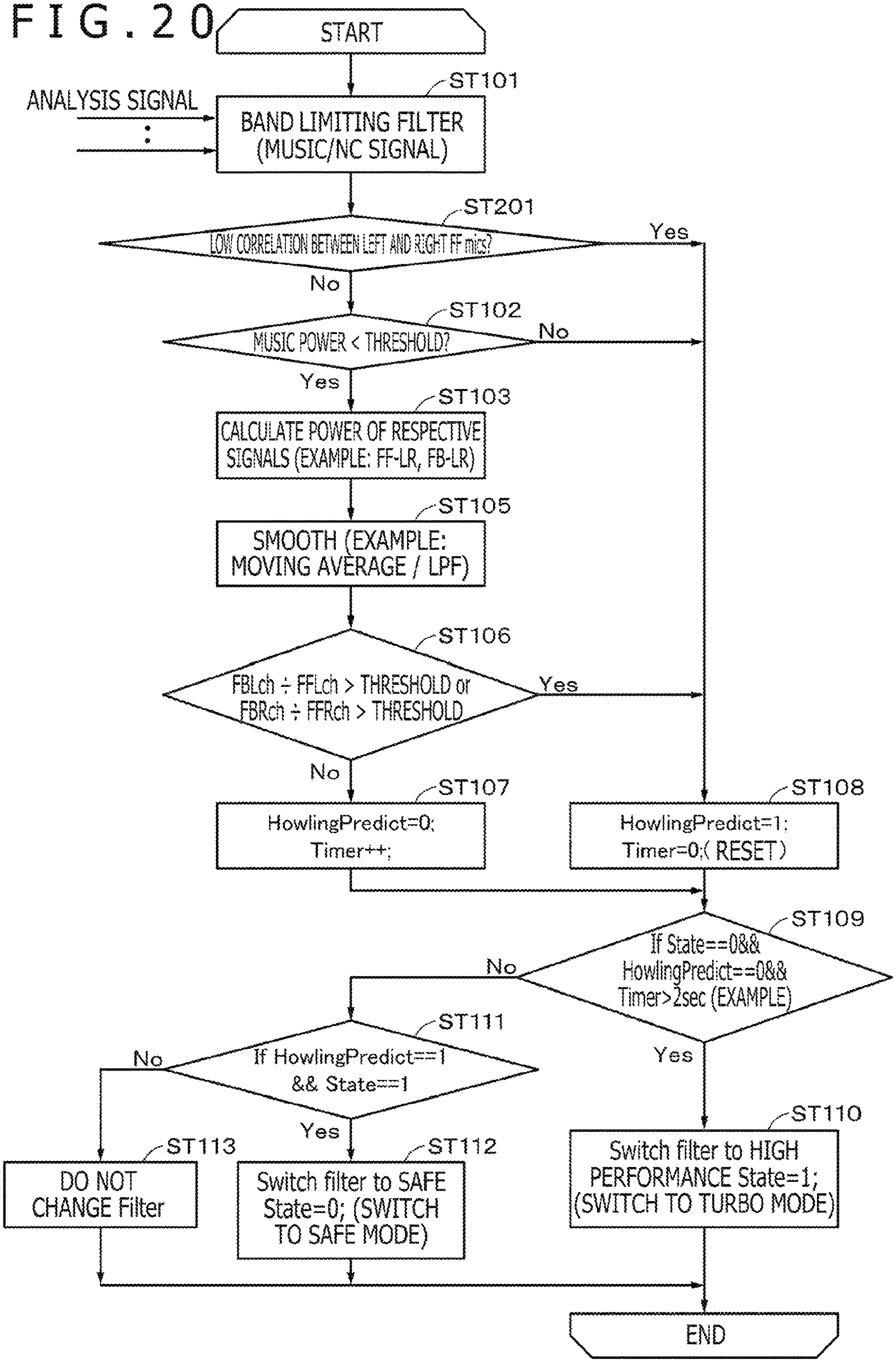
FIG. 20 is a flowchart referred to for explaining a second processing example executable by the headphone according to the present embodiment.

Subsequently, a process performed in a second processing example executable by the headphone 10 will be specifically described with reference to a flowchart depicted in FIG. 20. Note that the same processes as those of the first processing example are given the same reference numbers, and repetitive description concerning processing contents will be omitted where appropriate.

The second processing example is different from the first processing example in that step ST201 is added between the processing in step ST101 and the processing in step ST102. The FF microphone 24 may collect noise (d1) uncorrelated to the noise N as the cancelling target in some cases. Specific examples of d1 includes wind noise and a sound produced by rubbing the microphone with a finger. These sounds have randomness. Accordingly, the correlation between the left and right FF microphones does not hold. On the other hand, when these types of noise are absent, signals emitted from the same noise source are collected as the left and right signals. Accordingly, a high correlation is detected between the signals of the collected sounds. In a case where power is used for determination in step ST102, a distinction between signals based on N and signals based on d1 is difficult to make. In this case, prediction of a risk of howling generation is not appropriately achieved using a threshold set on an assumption of absence of d1 (threshold in step ST102). Accordingly, erroneous determination or detection omission may be caused. According to the second processing example, therefore, the process proceeds to step ST102 in a case where a certain correlation of the signals of the sounds collected by the left and right FF microphones 24 or higher is exhibited (in a case where d1 is at a certain level or lower). If this is not the case, the process proceeds to step ST108. In this step, (Howling_Predict==1) is set to forcibly shift to the safe mode. In this manner, a risk of generation of howling can be predictable accurately.

Third Processing Example

Figure 21:
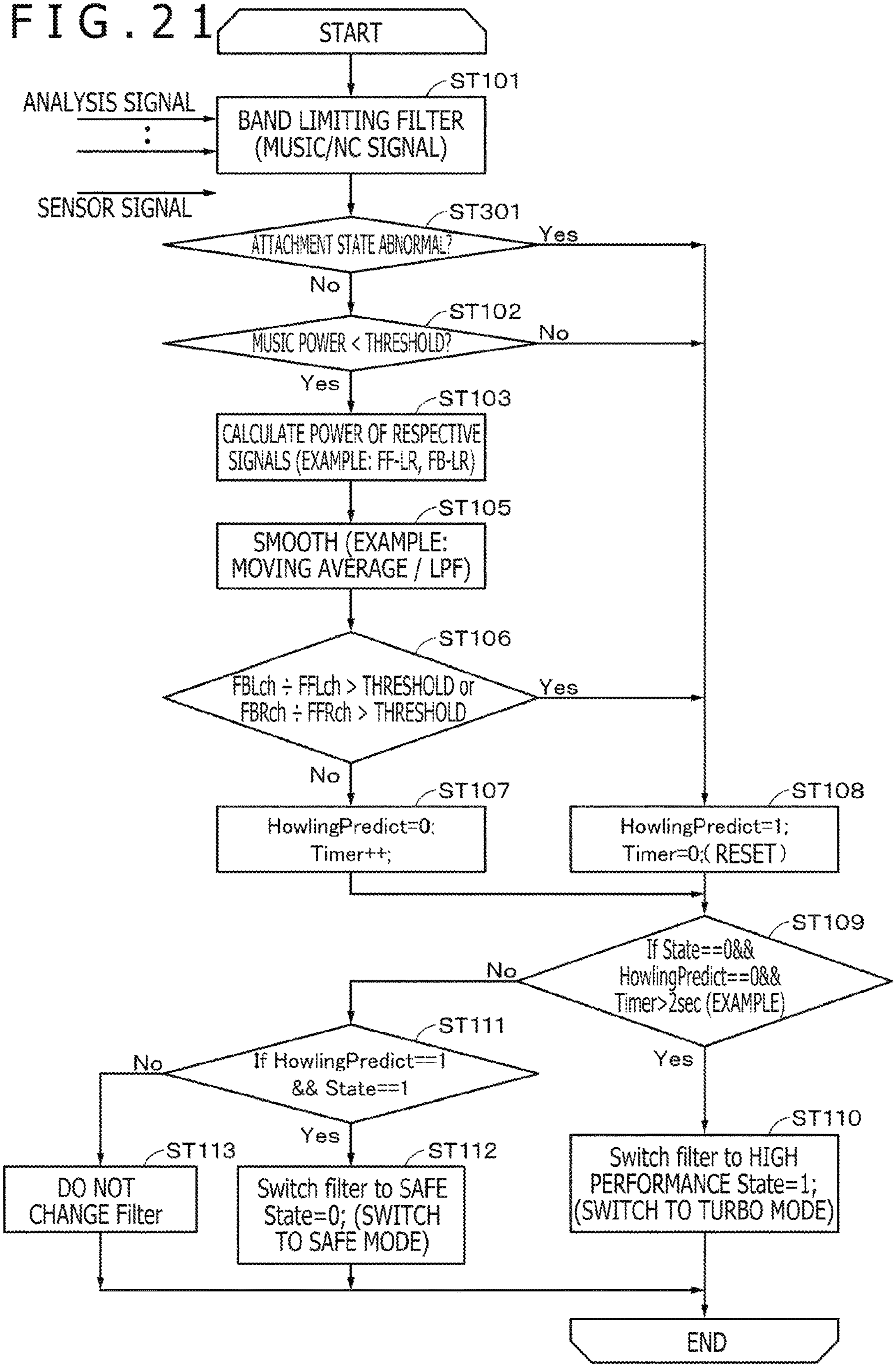
FIG. 21 is a flowchart referred to for explaining a third processing example executable by the headphone according to the present embodiment.

Subsequently, a process performed in a third processing example executable by the headphone 10 will be specifically described with reference to a flowchart depicted in FIG. 21. Note that the same processes as those of the first processing example are given the same reference numbers, and repetitive description concerning processing contents will be omitted where appropriate. In the third processing example, sensing data detected by the sensor 16 is input to the control unit 20. Thereafter, the attachment state of the headphone 10 is determined using this sensing data as well in this example.

The third processing example is different from the first processing example in that step ST301 is added between the processing in step ST101 and the processing in step ST102. The item HM of the open loop changes at the time of a press of the earpad 15, by incomplete and unfitted attachment, in a state completely removed, or for other reasons. For example, when the earpad 15 is pressed with a certain level of strength or higher, the distance between the inside of the housing and the head decreases as a result of a crush of the earpad 15. As described above, this phenomenon is detectable using a distance sensor, a pressure sensor, an optical sensor, or the like. Other phenomena which may cause a change of HM are similarly detectable as well as the phenomenon of a press of the earpad 15. Accordingly, in step ST301, if the attachment state of the headphone 10 is the normal attachment state on the basis of a detection result obtained by the sensor 16, the process is configured to proceed to step ST102. In a case where the attachment state is determined to be the abnormal attachment state, the process is configured to proceed to step ST108. In this step, (Howling_Predict==1) is set to forcibly shift to the safe mode. In this manner, a risk of generation of howling can be predictable accurately.

Note that the attachment state of the headphone 10 may be detected on the basis of only the sensing data obtained by the sensor 16. However, sensor signals are generally acquired by polling via a system data bus such as $I^2C$. Accordingly, only data rougher than sound signals is acquired in many cases.

It is therefore preferable to perform a process for detecting the attachment state of the headphone 10 further using sound signals as in this example.

Fourth Processing Example

Figure 22:
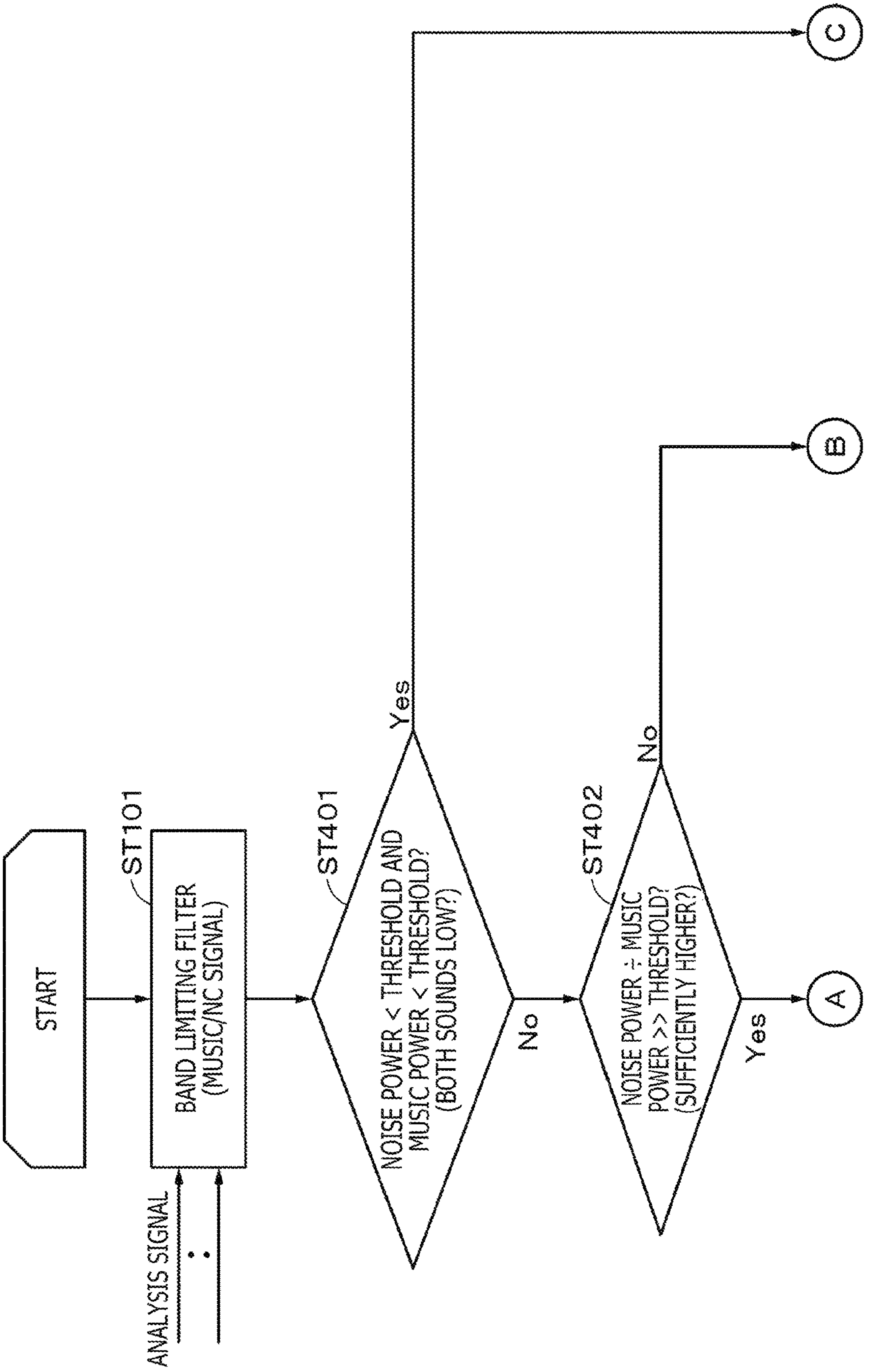
FIG. 22 is a flowchart referred to for explaining a fourth processing example executable by the headphone according to the present embodiment.
Figure 23:
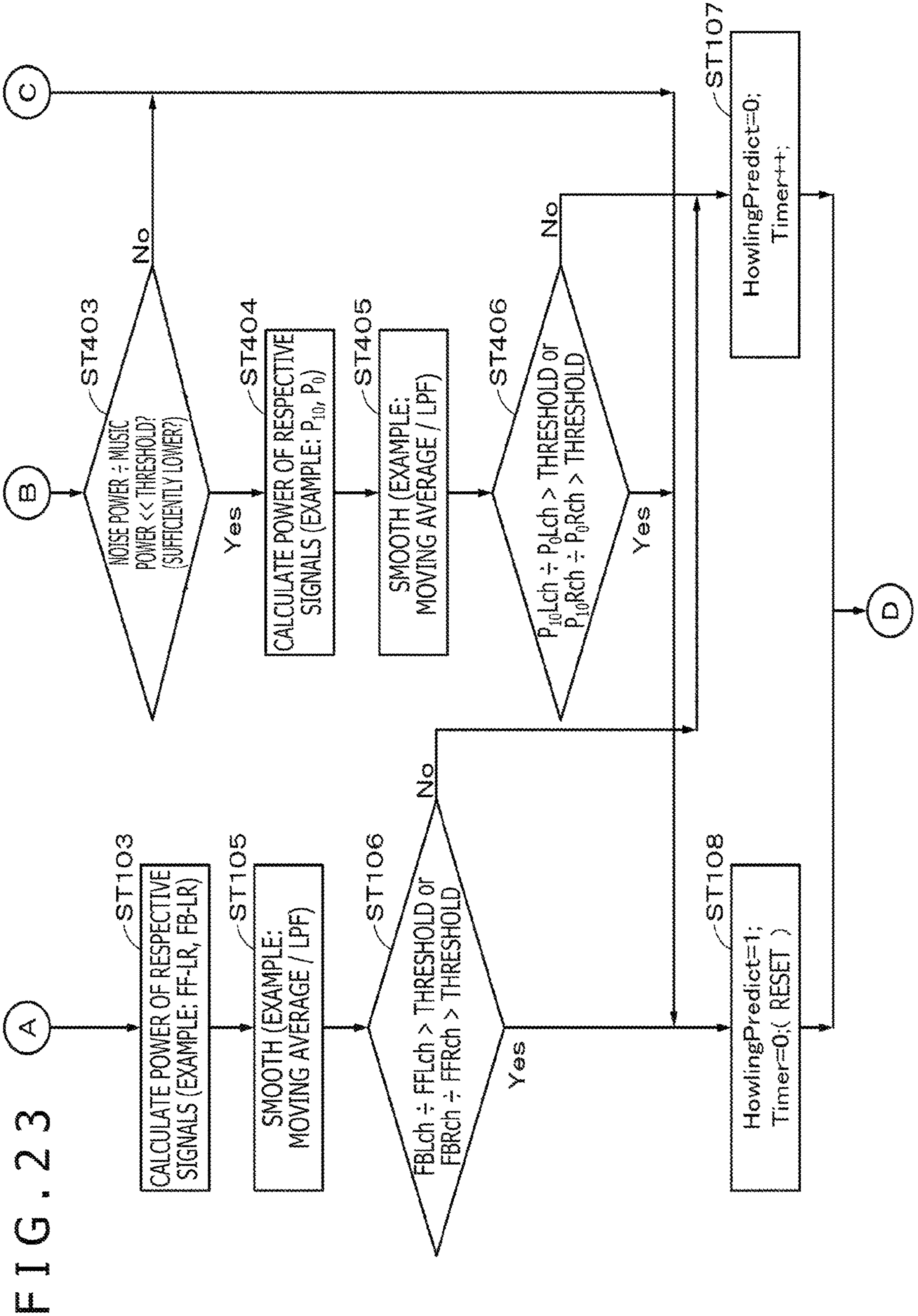
FIG. 23 is a flowchart referred to for explaining the fourth processing example executable by the headphone according to the present embodiment.

Subsequently, a process performed in a fourth processing example executable by the headphone 10 will be specifically described with reference to flowcharts depicted in FIGS. 22 and 23. Note that the same processes as those of the first processing example are given the same reference numbers, and repetitive description concerning processing contents will be omitted where appropriate. The fourth processing example is an example which distinguishes between Pattern 2 and Pattern 3 described above (see FIG. 17) and switches the detection signal in accordance with the distinguished pattern. Note that each of "A," "B," and "C" in FIG. 22, and "D" in FIG. 23 represents a symbol indicating continuity of processing and does not represent a particular process.

The fourth processing example adds a determination process in step ST401 and a determination process in step ST402 between the processing in step ST101 and the processing in step ST102. In step ST401, it is determined whether or not the power of noise is lower than a threshold and whether or not the power of the music signal m is lower than a threshold. In other words, in step ST401, whether or not both the power of the music signal m and the power of the noise are low, i.e., whether or not the current pattern corresponds to Pattern 4.

In a case where the determination result in step ST401 is Yes, i.e., in a case of Pattern 4, both the power of the music signal m and the power of the noise are low. In this case, a risk of generation of howling is difficult to accurately predict. Accordingly, in a case where the determination result of step ST401 is Yes, the process proceeds to step ST108. In this step, (Howling_Predict==1) is always set. In a case where the determination result in step ST401 is Yes, the mode may be fixed to the safe mode to stop the process for predicting a risk of generation of howling itself, or the attachment state of the headphone 10 may be determined on the basis of only the sensing data obtained by the sensor 16.

In a case where the result of step ST401 is No, the process proceeds to step ST402. In step ST402, it is determined whether or not the power of noise or the power of the music signal m is sufficiently higher than a threshold. The power of the noise is calculated using the power of the noise collected by the FF microphones 24. However, the power of the noise collected by the FB microphones 25 may be used. In a case where the determination result in step ST402 is Yes, the music signal m is absent, or the power of the music signal m is sufficiently lower than the power of the noise. Accordingly, the current pattern corresponds to Pattern 2. Thereafter, the process proceeds to step ST103. Each of processing in steps ST103, ST105, and ST106 is similar to the corresponding processing in the first processing example described above. Accordingly, repeated description is omitted.

In a case where the result of step ST402 is No, the process proceeds to step ST403. In step ST403, it is determined whether or not the power of noise or the power of the music signal m is sufficiently lower than a threshold. In a case where the determination result in step ST403 is No, the current pattern corresponds to Pattern 1. In this example, (Howling_Predict==1) is set in the case where the determination result in step ST403 is No.

In a case where the determination result in step ST403 is Yes, the music signal m is sufficiently higher than the noise. Accordingly, the current pattern corresponds to Pattern 3. In the case where the determination result of step ST403 is Yes, processing in steps ST404 to ST405 is performed. Contents of the processing performed in steps ST403 to ST406 are the same as the contents of the processing performed in steps ST103 to ST105. However, the detection signal is different. As described above, in the case of Pattern 2, cancelling of the HM characteristic using HM' is not appropriately achieved when deviation between actual HM and HM' modeled and retained within the noise cancelling process increases. Accordingly, on the basis of this fact, deviation of HM is detectable by observing a ratio of the signal $P_{10}$ to the signal $P_0$. By performing this processing in steps ST404 to ST405, (Howling_Predict) is appropriately set. Specifically, in a case where the ratio of the signal $P_{10}$ to the signal $P_0$ (of either one of the L channel and the R channel) is larger than a threshold, the process proceeds to step ST108. In a case where this ratio is smaller than the threshold, the process proceeds to step ST107.

Note that the process "D" is performed subsequently to the processing in steps ST107 and ST108. The process "D" represents the processing associated with steps ST109 to ST113 described above. Accordingly, repeated description associated with the process "D" is omitted.

Fifth Processing Example

Figure 24:
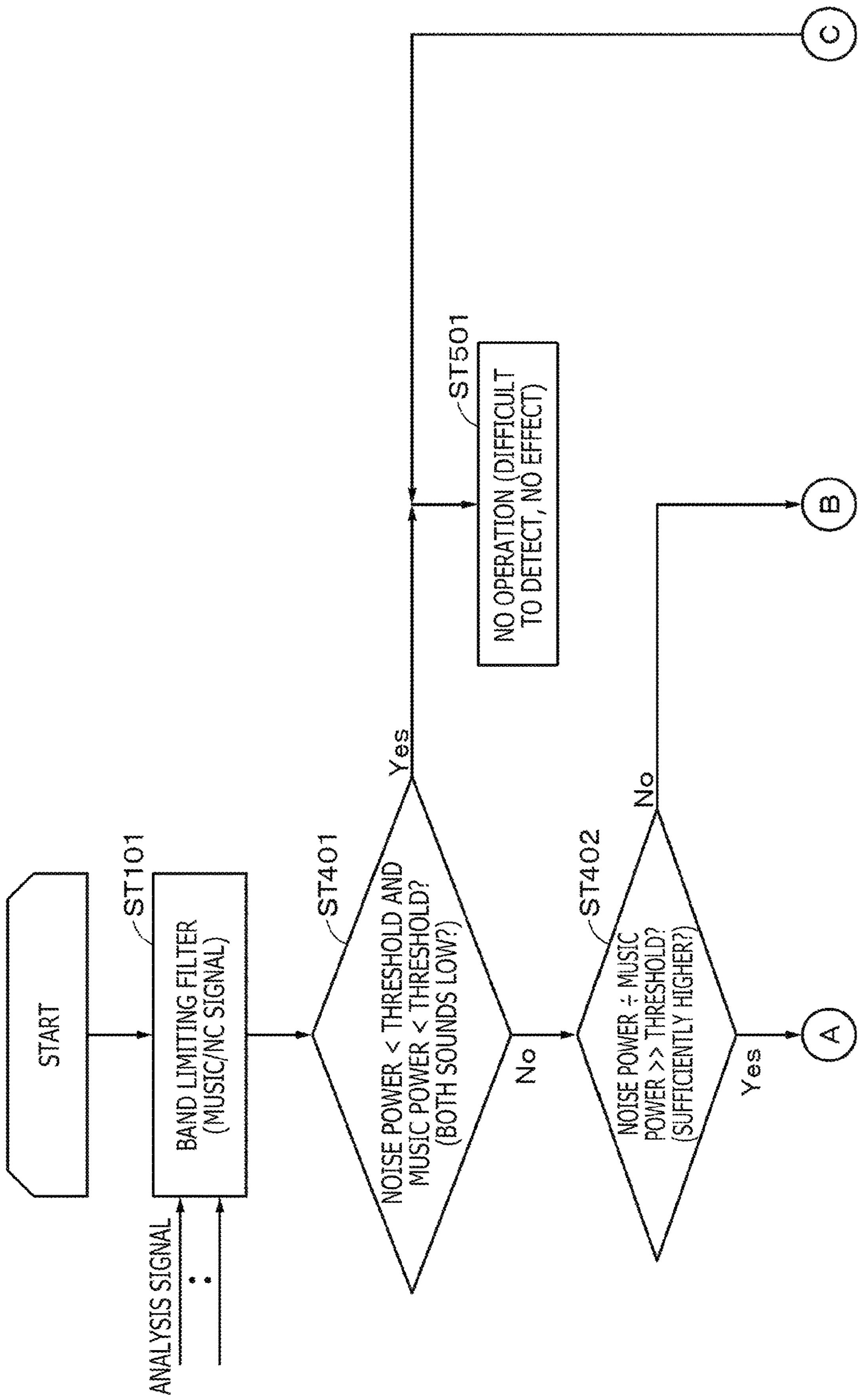
FIG. 24 is a flowchart referred to for explaining a fifth processing example executable by the headphone according to the present embodiment.
Figure 25:
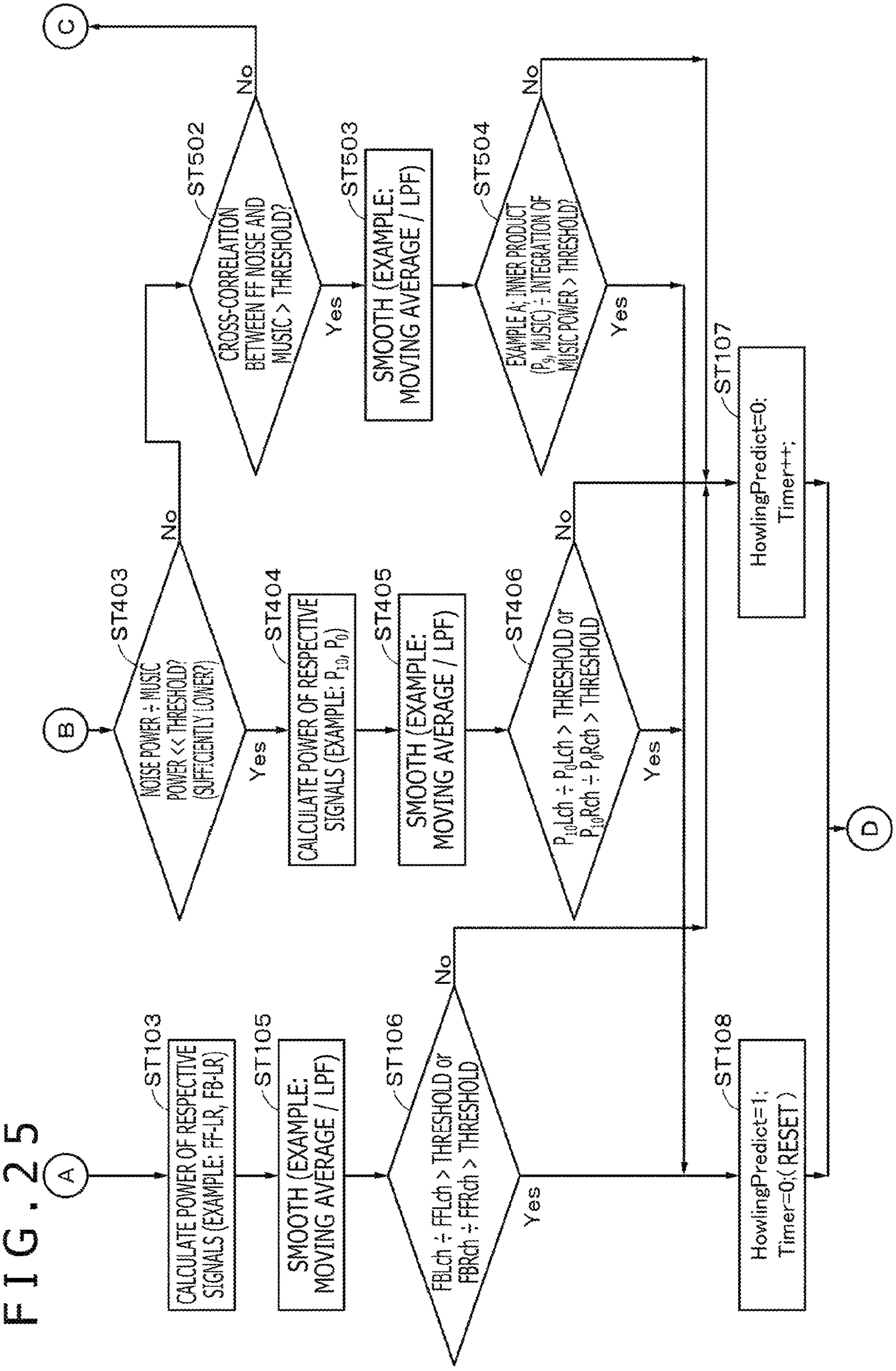
FIG. 25 is a flowchart referred to for explaining the fifth processing example executable by the headphone according to the present embodiment.

Subsequently, a process performed in a fifth processing example executable by the headphone 10 will be specifically described with reference to flowcharts depicted in FIGS. 24 and 25. Note that the same processes as those of the fourth processing example are given the same reference numbers, and repetitive description concerning processing contents is omitted where appropriate. The fifth processing example is an example which distinguishes between the four patterns described above (see FIG. 17), and switches the detection signal in accordance with the distinguished pattern. Note that each of "A," "B," "C," and "D" represents a symbol indicating continuity of processing, and does not represent a particular process, as in the fourth processing example.

In a case where the determination result in step ST401 is Yes, i.e., the current pattern corresponds to Pattern 4, in the fifth processing example, the process proceeds to step ST501. In the case of Pattern 4, a change of HM is difficult to detect. Accordingly, no operation is performed until the next processing unit.

Moreover, this processing example is different from the fourth processing example in that the process proceeds to step ST502 in a case where the determination result in step ST403 is No. As described above, the state where the determination result in step ST403 is No corresponds to Pattern 1. Pattern 1 is a range where the ratio of the music signal m to the energy of the noise is small. In this case, components associated with N and m in the transfer function are close to each other. Accordingly, a change of the transfer function is difficult to detect on the basis of only power in this range.

This example performs processing which utilizes a temporal property difference between the noise and the music signal. When the noise has sufficient randomness, autocorrelation of the noise is basically close to 0. On the other hand, music often has a pitch property (cyclic property) and exhibits a high autocorrelation. Assuming these properties, a change of HM is detectable if a cross-correlation between the noise (signals collected by the FF microphones 24) and the music signals (reproduction signals) at a certain level or higher is exhibited.

Accordingly, it is determined in step ST502 whether or not a cross-correlation between the noise (signals of sound collected by the FF microphones 24) and the music signals (reproduction signals) is equal to or higher than a threshold. In a case where a cross-correlation at a certain level or higher is not exhibited, a change of HM is difficult to detect. Accordingly, the process proceeds to step ST501. In a case where a cross-correlation at a certain level or higher is exhibited, the process proceeds to step ST503.

In step ST503, power excessively changes from moment to moment in a case of signals generated from noise. Accordingly, smoothing is performed in a time direction. Smoothing is performed by using a moving average, a low-pass filter, or the like. Thereafter, the process proceeds to step ST504.

In step ST504, a process which uses the signal ($P_0$) and the signal of $P_9$ of sounds collected by the FB microphones 25 as detection signals is performed. The signal of $P_0$ contains a music signal currently reproduced. However, when the internal model (HM') is equivalent to actual HM, the music component is cancelled by ($P_0$–$P_{11}$). In this case, the music signal m does not appear in $P_9$. Accordingly, only noise not removed by noise cancelling remains in $P_9$. At this time, an inner product of the signal $P_9$ and the music signal m is calculated at a certain time window length. The inner product is an index indicating "similarity between these signals," and increases for similar signals and decreases for unsimilar signals. When HM is equivalent to HM' of the inner model, i.e., during the normal attachment state of the headphone 10, the inner product decreases. On the other hand, in a case of deviation between HM' of the inner model and actual HM, cancelling based on the inner model is not appropriately achieved. In this case, $P_9$ contains not only the noise not removed but also a large volume of music components. Accordingly, the similarity between the signal of $P_9$ and the music signal m increases, and the inner product of $P_9$ and the music becomes larger than that of a normal state.

Specifically, in a case where the determination result in step ST504 is Yes, i.e., a result of the inner product is larger than a predetermined threshold, this result indicates that the attachment state of the headphone 10 is the abnormal attachment state. Accordingly, the process proceeds to step ST108, and "1" is set as (Howling_Predict). Moreover, in a case where the determination result in step ST504 is No, i.e., the result of the inner product is smaller than the predetermined threshold, this result indicates that the attachment state of the headphone 10 is the normal attachment state. Accordingly, the process proceeds to step ST107, and "0" is set as (Howling_Predict). The processing in steps ST107 and ST108 and the following steps has already been described, and therefore repeated explanation is omitted.

Note that the inner product in this example is divided by an integrated value of the power of the music signal. In this manner, the inner product is normalized, and setting of the threshold is facilitated.

Contents of the processing in step ST504 described above (hereinafter referred to as a processing example A where appropriate) may be contents of other processing (hereinafter referred to as a processing example B where appropriate). While a correlation example between the music signal and $P_x$ is used in the processing example A, the same is achievable by an increase or a decrease of the correlation between the noise signal and $P_x$ as the processing example B. When HM and HM' of the inner model are equivalent to each other, the noise not removed and the music signal are input to the signals of the sounds collected by the FB microphones 25. In this case, only noise "at the time of absence of the feedback loop" appears in $P_{10}$. Accordingly, when HM is close to HM' of the inner model, i.e., in the normal attachment state, the inner product corresponding to the similarity between $P_0$ and $P_{10}$ is not high. When HM and the model of HM' deviate from each other, both the music component and the noise appear in $P_{11}$, and the similarity (inner product) increases. In such a manner, the attachment state of the headphone 10 may be determined in accordance with the result of the inner product of the signal of $P_0$ and the signal of $P_{10}$. Note that the result of the inner product may be divided by the power of the signals of the sounds collected by the FB microphones 25, to normalize the result of the inner product. Moreover, either one of the processing example A or the processing example B described above may be performed, or both the processing examples may be performed to determine the attachment state of the headphone 10 in accordance with the respective results.

Sixth Processing Example

Figure 26:
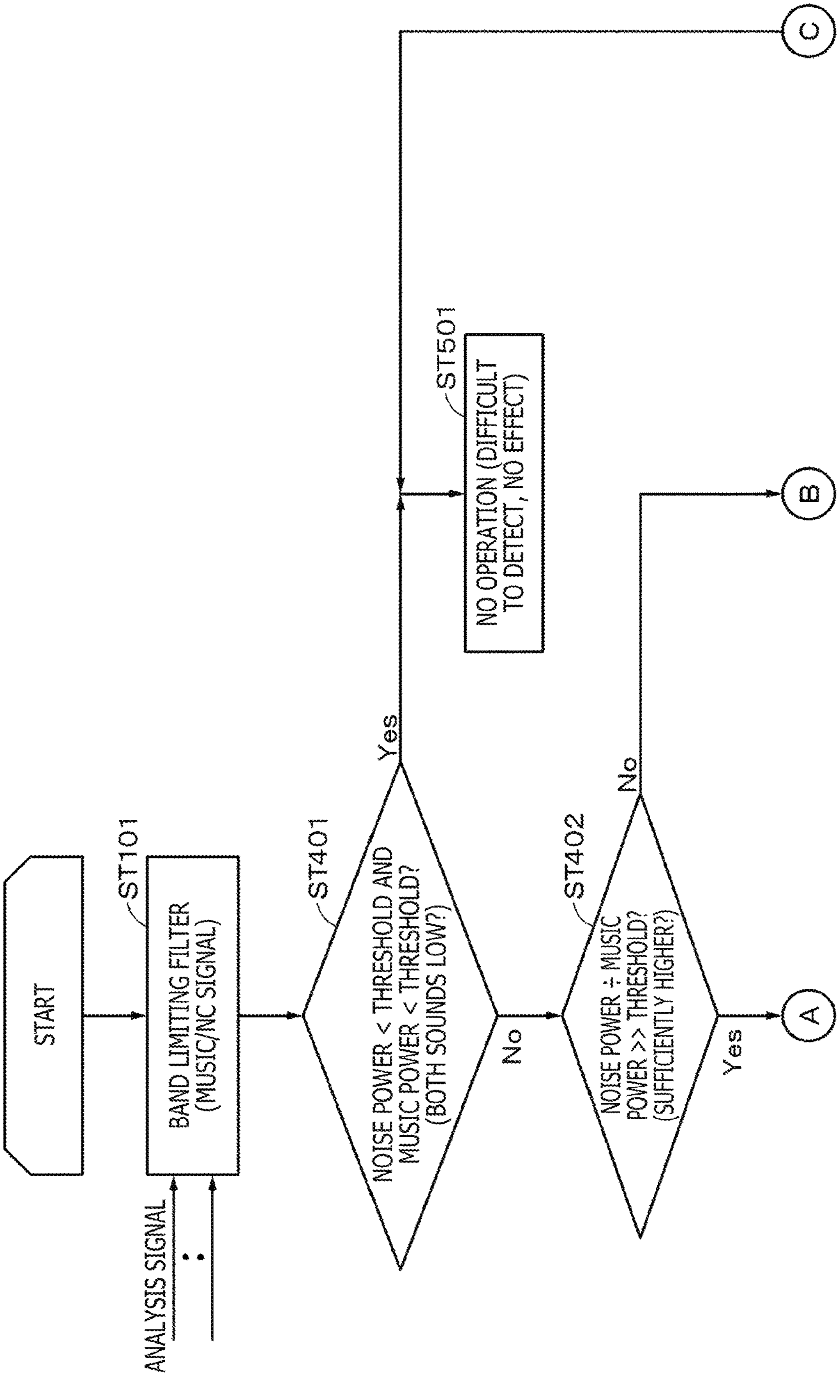
FIG. 26 is a flowchart referred to for explaining a sixth processing example executable by the headphone according to the present embodiment.
Figure 27:
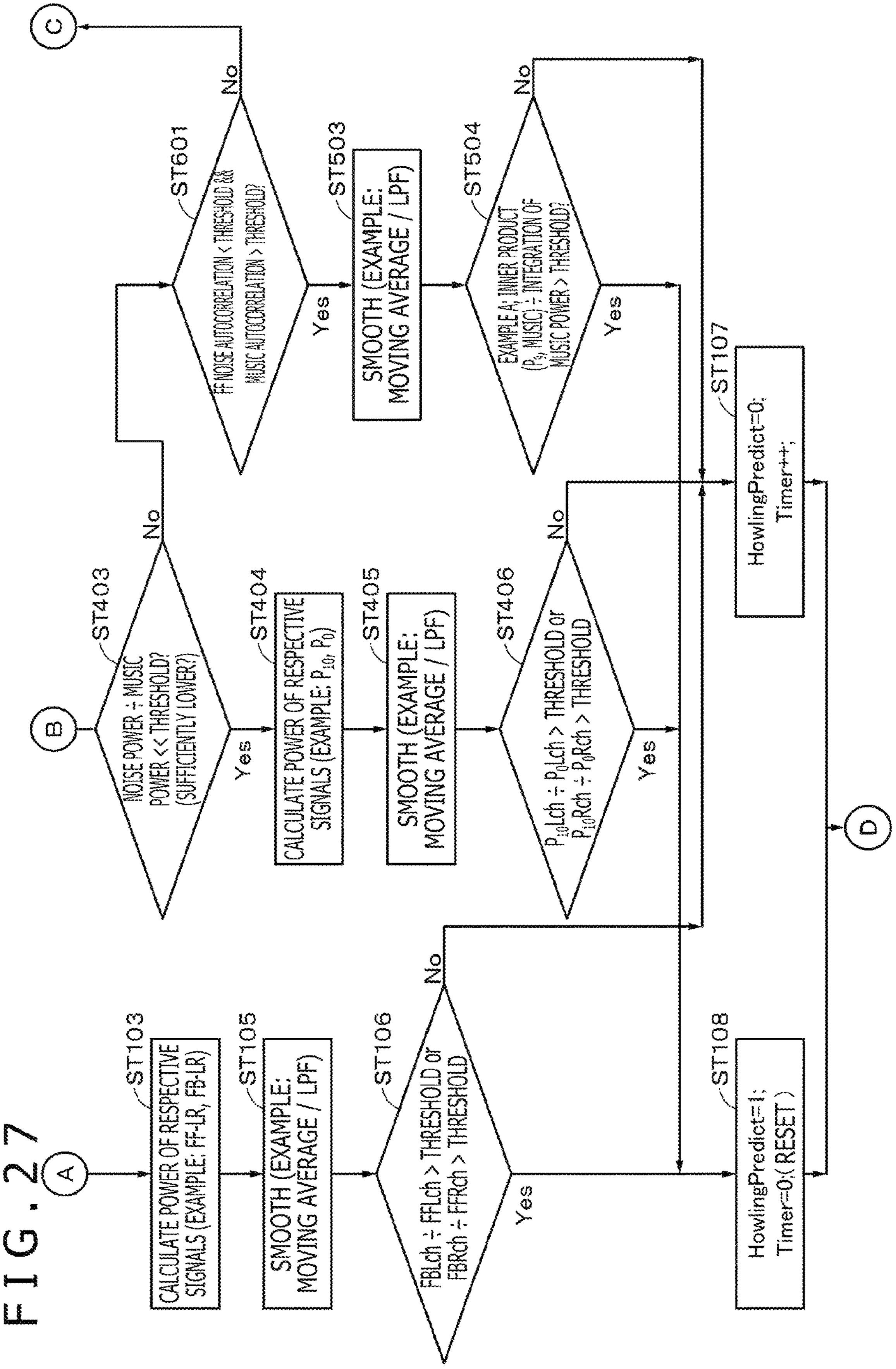
FIG. 27 is a flowchart referred to for explaining the sixth processing example executable by the headphone according to the present embodiment.

Subsequently, a process performed in a sixth processing example executable by the headphone 10 will be specifically described with reference to flowcharts depicted in FIGS. 26 and 27. Note that the same processes as those of the fifth processing example are given the same reference numbers, and repetitive description concerning processing contents is omitted where appropriate. Note that each of "A," "B," "C," and "D" represents a symbol indicating continuity of processing, and does not represent a particular process, as in the fifth processing example.

The sixth processing example is different from the fifth processing example in that the contents of the processing associated with step ST502 are replaced with contents of processing associated with step ST601. Performed in step ST502 in the fifth processing example has been the process which uses the cross-correlation between the noise collected by the FF microphones 24 and the music signals, by use of the temporal property difference between the noise and the music signals. However, the noise does not necessarily have randomness, and the music does not necessarily have the pitch property. Some noise has, for example, a cyclic property, such as a bell sound at a railroad crossing, a buzzer sound, and environmental BGM (Back Ground Music). On the other hand, some music may not have, for example, a cyclic property such as a sound effect in a movie, and a sound having a high-level noise property. Considering these points, a process for calculating autocorrelation of noise and calculating autocorrelation of the music signal m will be performed in step ST601. In a case where a calculation result indicates that the exhibited autocorrelation of the noise is lower than a threshold (noise has randomness) and that the exhibited autocorrelation of the music signal m is higher than a threshold (the music signal m has a cyclic property), i.e., in a case where the determination result in step ST601 is Yes, the process is configured to proceed to step ST503. In a case where the determination result in step ST601 is No, the process is configured to proceed to step ST501. Other processing has already been described, and therefore repetitive explanation is omitted where appropriate.

Seventh Processing Example

Figure 28:
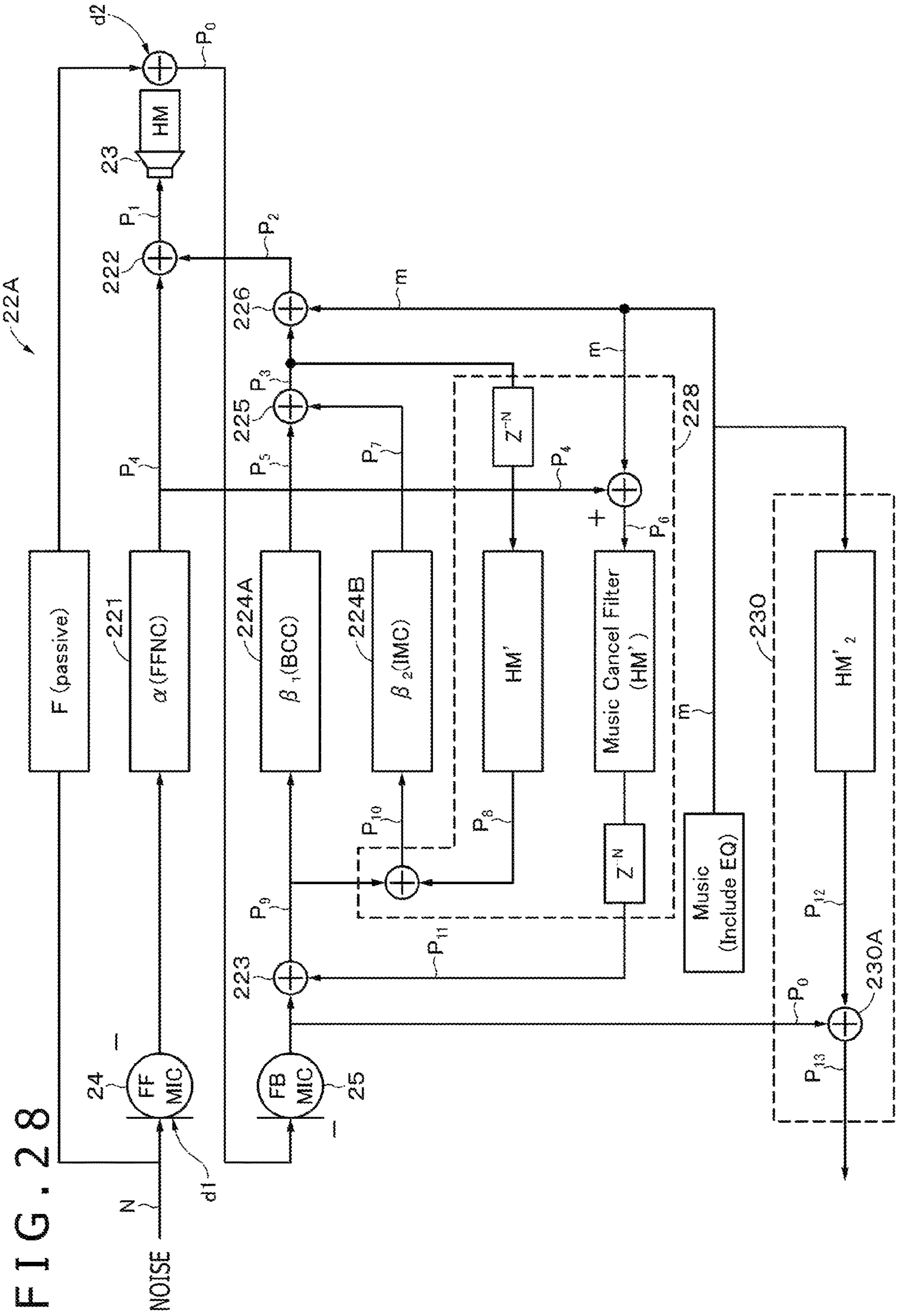
FIG. 28 is a diagram referred to for explaining the sixth processing example executable by the headphone according to the present embodiment.

Subsequently, a process performed in a seventh processing example executable by the headphone 10 will be specifically described with reference to FIGS. 28 to 30. Note that the same processes as those of the sixth processing example are given the same reference numbers, and repetitive description concerning processing contents is omitted where appropriate. Note that each of "A," "B," "C," and "D" represents a symbol indicating continuity of processing, and does not represent a particular process, as in the sixth processing example.

A noise cancel processing unit which performs a process associated with this example (hereinafter referred to as a noise cancel processing unit 22A where appropriate) has a configuration different from that of the noise cancel processing unit 22. Specifically, as depicted in FIG. 28, the noise cancel processing unit 22A has a characteristic giving unit 230. The characteristic giving unit 230 gives HM'2 as a characteristic to the music signal m. A signal to which the characteristic has been given (signal of $P_{12}$) is added to the signal of $P_0$ by an adder 230A, and a signal after addition (signal of $P_{13}$) is output from the adder 230A.

While HM' described above models HM in the normal attachment state, HM'2 models HM in the abnormal attachment state. Specifically, according to this example, deviation of actual HM from HM' modeling the normal attachment state is not detected. Instead, it is determined whether or not a risk of generation of howling is high in accordance with whether or not actual HM is close to HM'2 modeling the abnormal attachment state.

Figure 29:
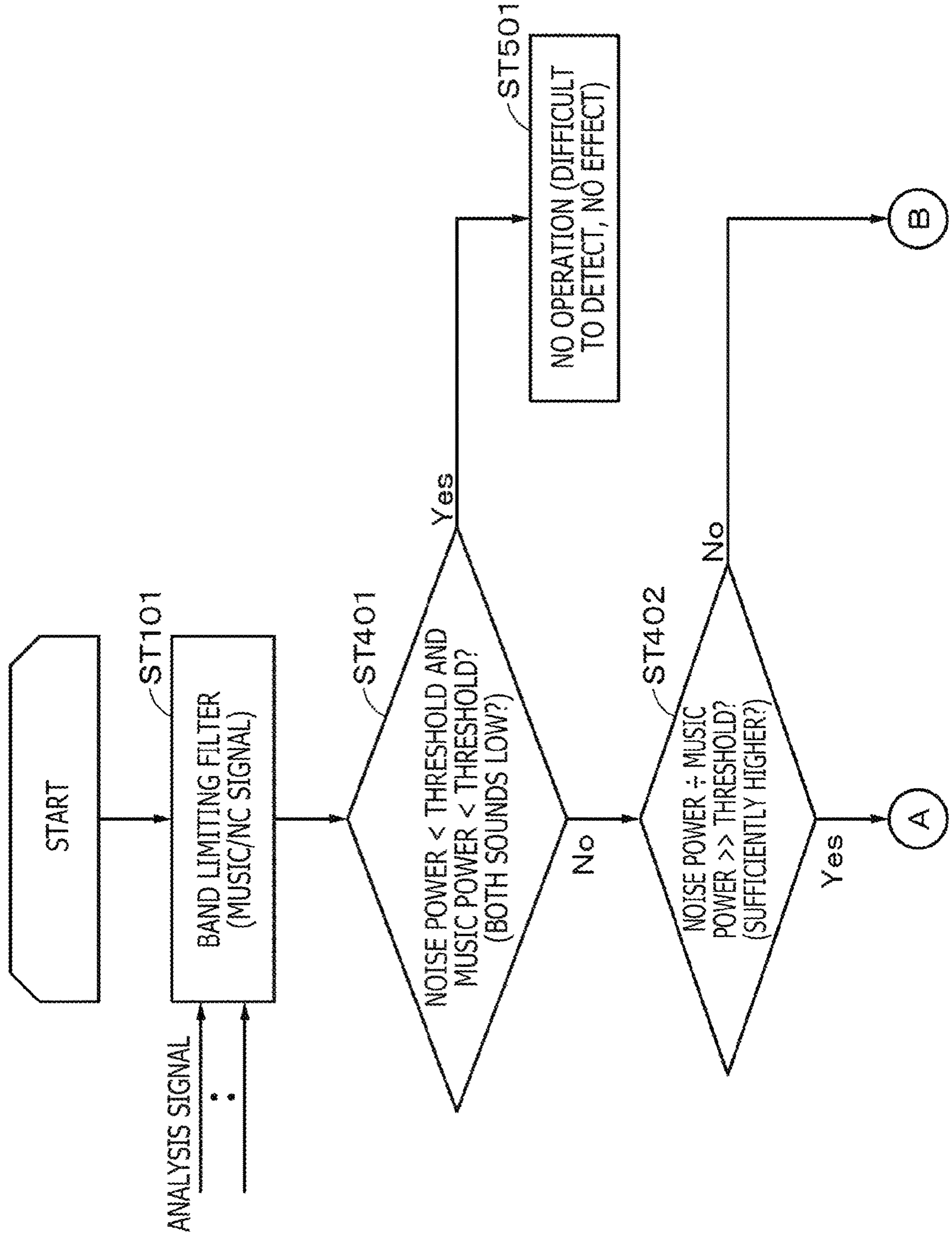
FIG. 29 is a flowchart referred to for explaining a seventh processing example executable by the headphone according to the present embodiment.
Figure 30:
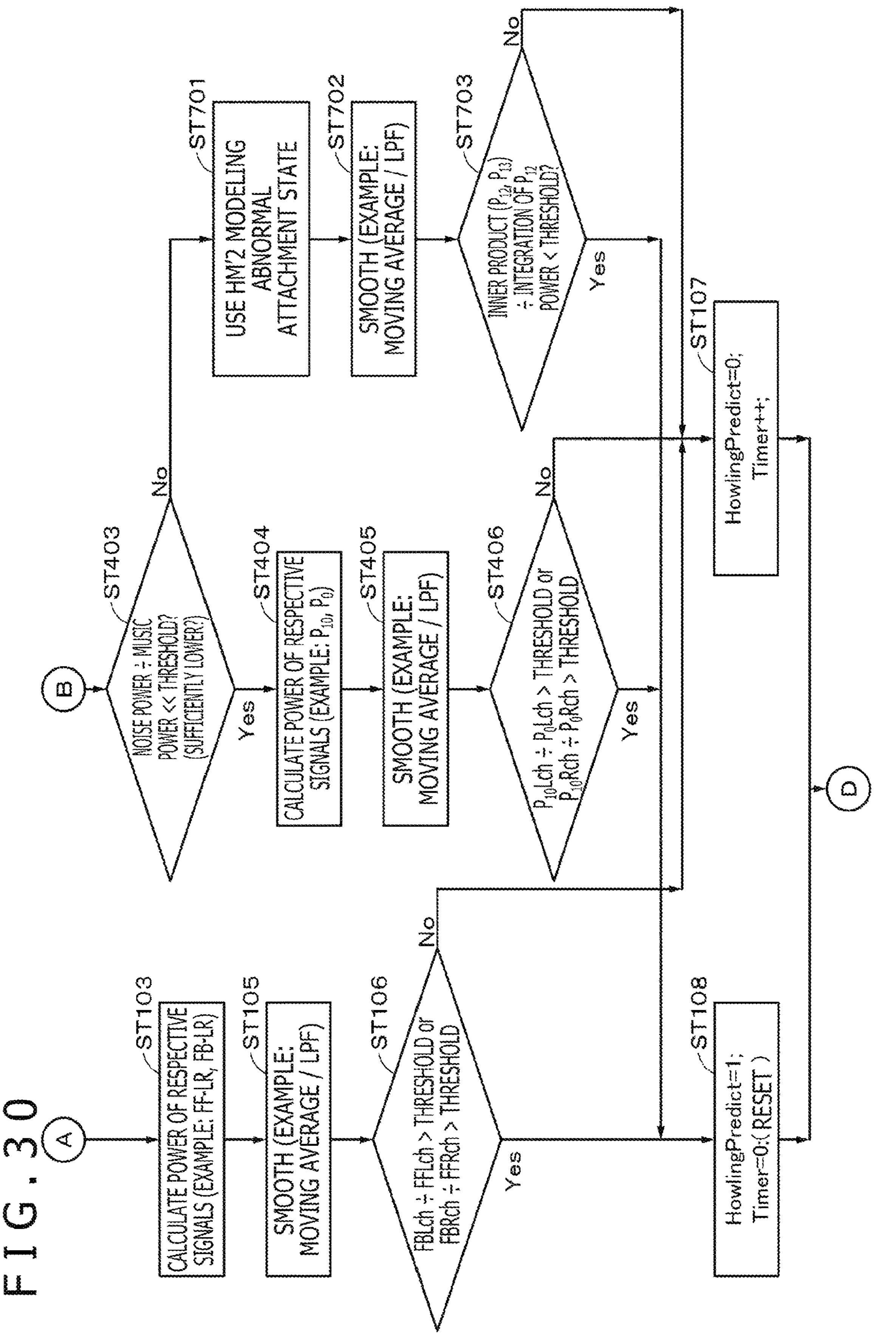
FIG. 30 is a flowchart referred to for explaining the seventh processing example executable by the headphone according to the present embodiment.

The process continues from "B" in FIG. 29 to "B" in FIG. 30. Thereafter, the determination process in step ST403 is performed. In a case where the determination result in step ST403 is No, the process proceeds to step ST701. After use of HM'2 modeling the abnormal attachment state is set in processing in step ST701, the process proceeds to step ST702 to perform a smoothing process. After completion of the processing in step ST702, processing associated with step ST703 is performed.

When the attachment state of the headphone 10 here is the abnormal attachment state, i.e., in a case where noise cancelling operates in an acoustic state close to HM'2, a modelling error of HM'2 is small. In this case, music components contained in $P_{13}$ decrease, and signals derived from noise become dominant. $P_{12}$ (or music signal m) contains music components. Accordingly, an internal product (similarity) of $P_{12}$ (or music signal m) and $P_{13}$ decreases. On the other hand, in a case where noise cancelling operates under HM other than HM'2, e.g., HM in the normal attachment state, a modelling error increases. In this case, $P_{13}$ contains a large volume of components derived from music, and the inner product (similarity) of $P_{12}$ (or music signal m) and $P_{13}$ increases.

Specifically, in a case where an inner product result obtained in step ST703 is smaller than a threshold, it is determined that the headphone 10 is in the abnormal attachment state. In this case, the process proceeds to step ST108 to set "1" as (Howling_Predict). Moreover, in a case where an inner product result obtained in step ST703 is larger than the threshold, it is determined that the headphone 10 is in the normal attachment state. In this case, the process proceeds to step ST107 to set "0" as (Howling_Predict). The processing in steps ST107 and ST108 and the following steps has already been described, and therefore repetitive explanation is omitted.

In addition, for facilitating threshold setting, a calculation result of the inner product may be divided by power of the signal of $P_{12}$ to achieve normalization. When the inner product result is normalized by using the power of the signal of $P_{12}$, farness of HM'2 from current HM is also detectable. For example, assuming that current HM is a value corresponding to the normal attachment state, components contained in the signal of $P_0$ and generated by noise limitlessly decreases, and substantially all components are components of the music signal m. Accordingly, the normalized inner product becomes substantially 1. On the other hand, when current HM approaches a value corresponding to the abnormal attachment state, and approaches HM'2, the inner product approaches 0. This change of the inner product may be again mapped on a filter change rate, and a mixing rate of the two filters (filter circuits 224A and 224B) may be set to an intermediate value such as 30:70 rather than selection of either one of the two filters. Specifically, a mixing rate of output of the two filters may be set to a value corresponding to the inner product change rate. For example, when the model of HM in the normal attachment state (HM') is used, a change from HM' is detectable. However, it is difficult to determine what level of a risk of generation of howling is present. On the other hand, a distance (difference) from HM'2 corresponding to the state of actual howling is measured by using HM'2. Accordingly, the risk of generation of howling is more accurately detectable.

Note that HM'2 is not limited to HM modeling the abnormal attachment state, and may model HM corresponding to a state where detection is desired. Moreover, while the music signal m is input to the characteristic giving unit 230 in the above description, the abnormal attachment state of the headphone 10 is also detectable on the basis of input of the signal of $P_6$.

According to the embodiment described above, unnecessary reduction of noise cancelling performance is avoidable. Specifically, generation of howling is prevented by reducing noise cancelling performance to a predetermined level or lower at the time of a risk of generation of howling, while noise cancelling performance is exerted at the time of no risk of generation of howling to appropriately reduce noise.

<Modifications>

The contents of the present disclosure are not limited to the specific contents of the embodiment of the present disclosure described above, and may be modified in various manners on the basis of the technical idea of the present disclosure. Modifications will be hereinafter described.

Various types of methods for achieving the noise cancelling process have been proposed. The present disclosure is applicable not only to the method of the noise cancelling process according to the embodiment described above but also to known methods and methods which will be proposed in the future. Moreover, howling is generated in a feedback loop. Accordingly, at least a characteristic of a feedback filter needs to be changed in accordance with a risk of generation of howling. Filters other than the feedback filter may be included depending on methods of the noise cancelling process. The characteristics of these filters may be changed in accordance with the risk of generation of howling. Specific examples of this point will be hereinafter described.

Figure 31:
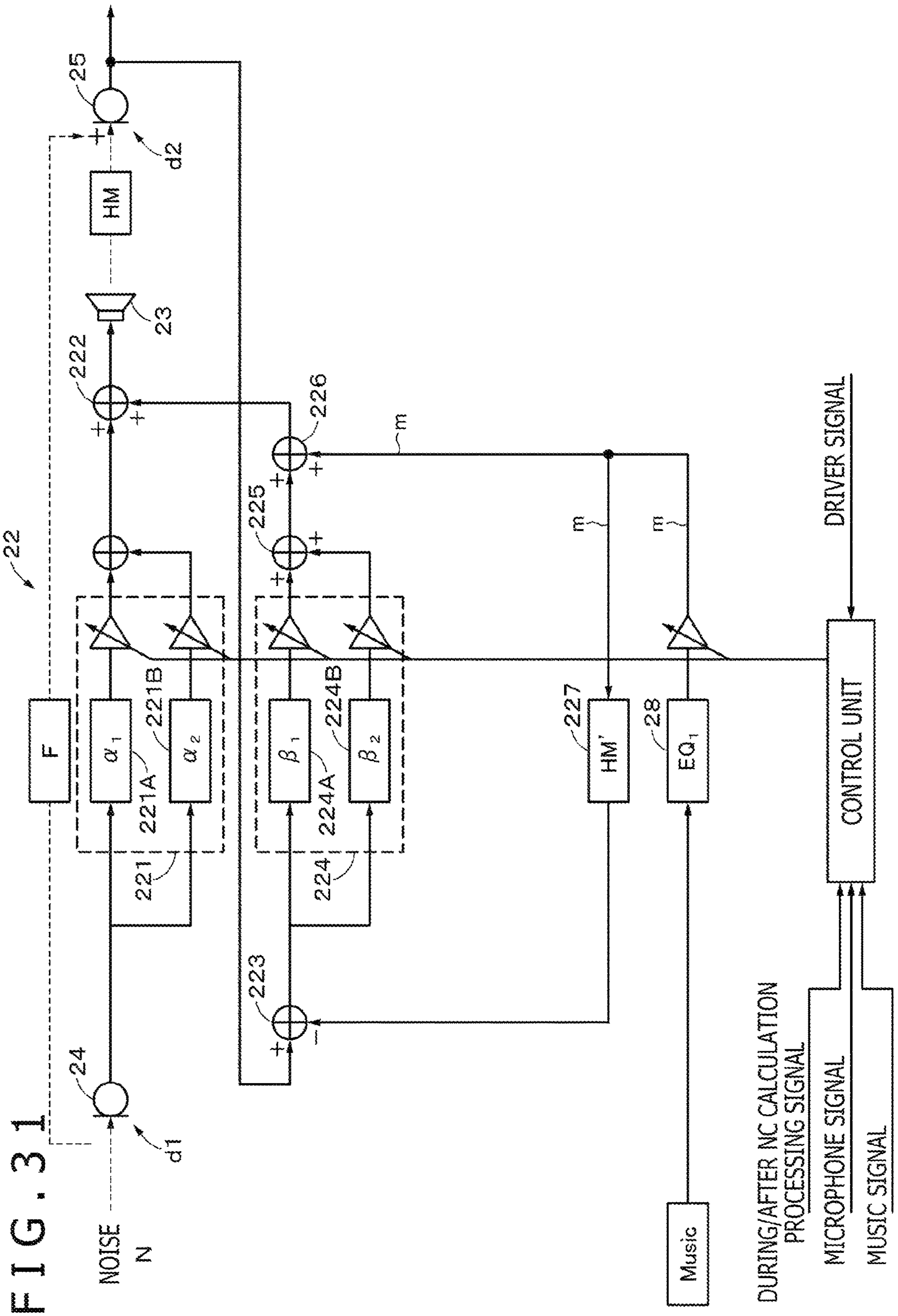
FIG. 31 is a diagram for explaining a modification.

As depicted in FIG. 31, the filter circuit 221 corresponding to a feedforward filter may include the filter circuits 221A (parameter gain $\alpha_1$) and 221B (parameter gain $\alpha_2$). Moreover, in a case of a change of the characteristic of the filter circuit 224, the characteristic of the filter circuit 221 may be changed by switching between the filter circuit 221A and the filter circuit 221B. For example, the filter circuit 221A is used in a case of use of the filter circuit 224A, and the filter circuit 221B is used in a case of use of the filter circuit 224B. When the characteristic of the feedback filter is changed, a closed loop changes. In this case, transfer functions associated with music signals and the feedforward filter change. Accordingly, sound quality can be improved in accordance with an appropriate change of the characteristic of the feedforward filter achieved by the change of the characteristic of the filter circuit 224. In this manner, lowering of noise cancelling performance is avoidable.

Figure 32:
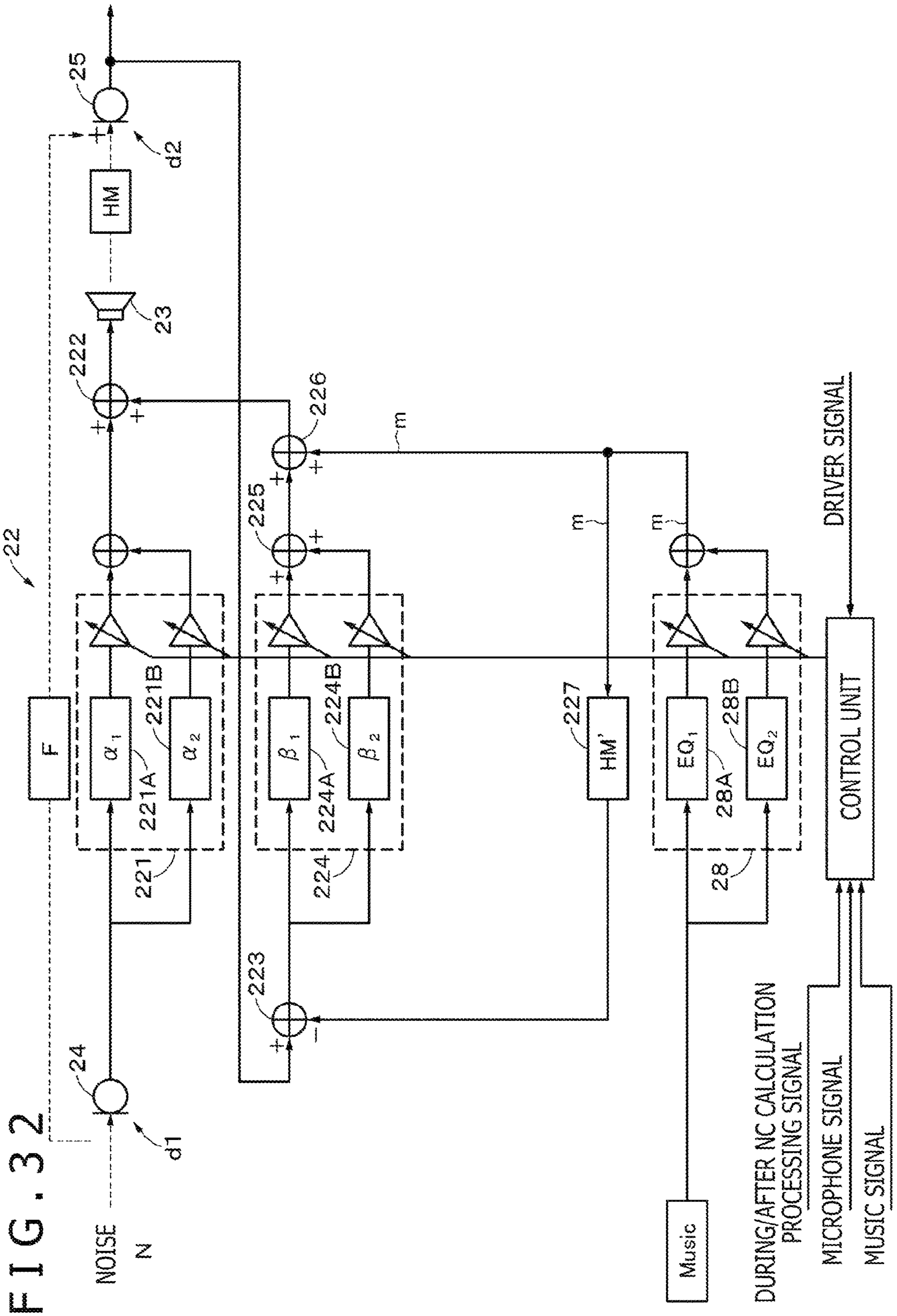
FIG. 32 is a diagram for explaining a modification.

As depicted in FIG. 32, the equalizer 28 which performs the equalizing process for the music signal m may include equalizers 28A and 28B (note that equalizer coefficients of the equalizers 28A and 28B are assumed to be different from each other). In addition, in a case of a change of the characteristic of the filter circuit 224, the characteristic of the equalizer 28 may be changed by switching between the equalizer 28A and the equalizer 28B. For example, the equalizer 28A is used in a case of use of the filter circuit 224A, and the equalizer 28B is used in a case of use of the filter circuit 224B. According to the configuration example of this modification, sound quality further can be improved in comparison with the configuration depicted in FIG. 31.

Figure 33:
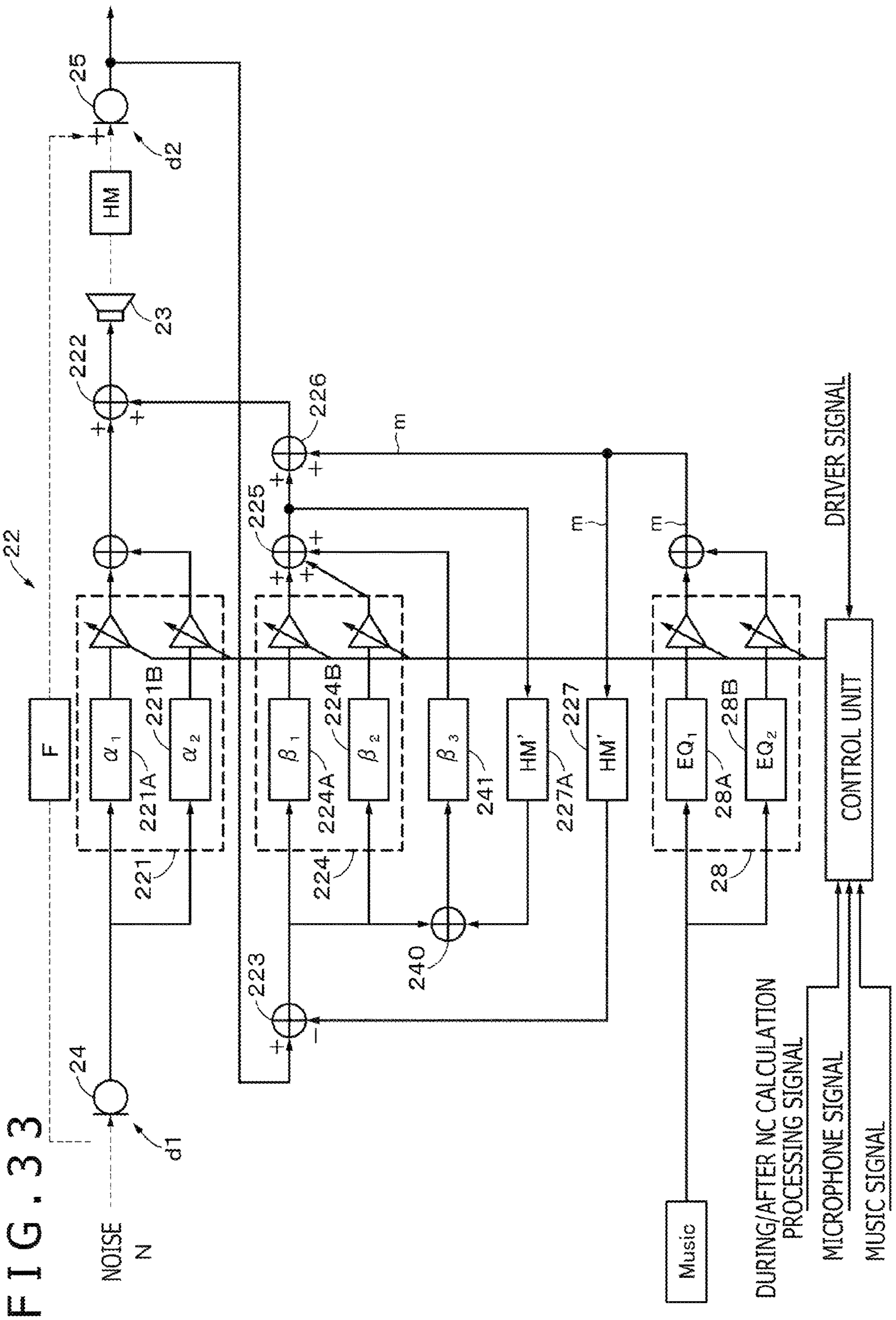
FIG. 33 is a diagram for explaining a modification.

The configuration of the noise cancel processing unit may have a system combining the BCC system and the IMC system (hereinafter referred to as a double feedback system where appropriate). FIG. 33 depicts a configuration of a noise cancel processing unit to which the double feedback system is applied. The noise cancel processing unit of the double feedback system has a configuration of a characteristic giving unit 227A which gives HM' as a characteristic to output of the adder 240, the filter circuit 241 (parameter gain $\beta_3$), and the adder 225, in addition to the configuration of the noise cancel processing unit 22. The adder 240 sums up an output of the subtracter 223 and an output of the characteristic giving unit 227A. The adder 225 sums up an output of the filter circuit 224 and an output of the filter circuit 241.

Figure 34:
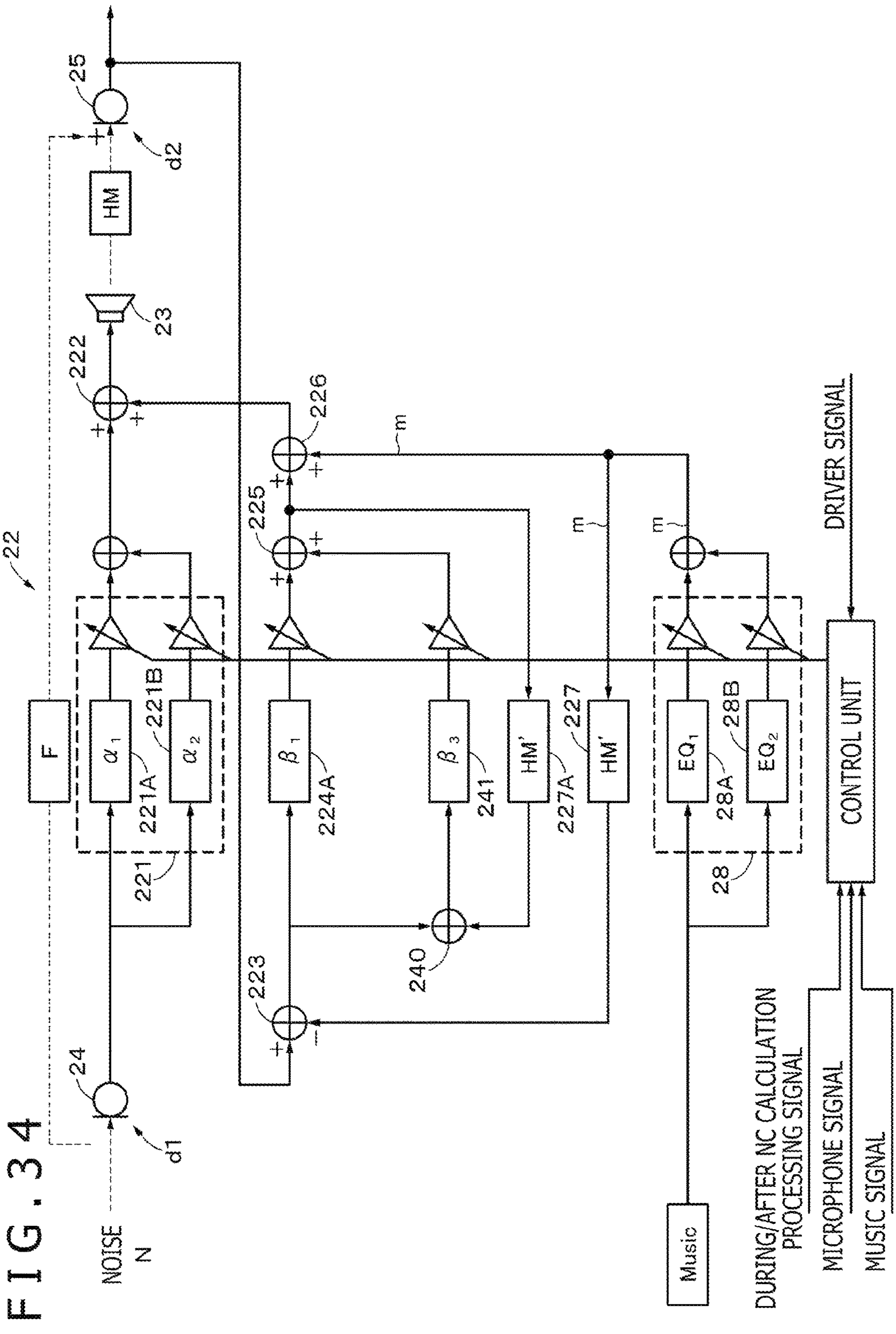
FIG. 34 is a diagram for explaining a modification.
Figure 35:
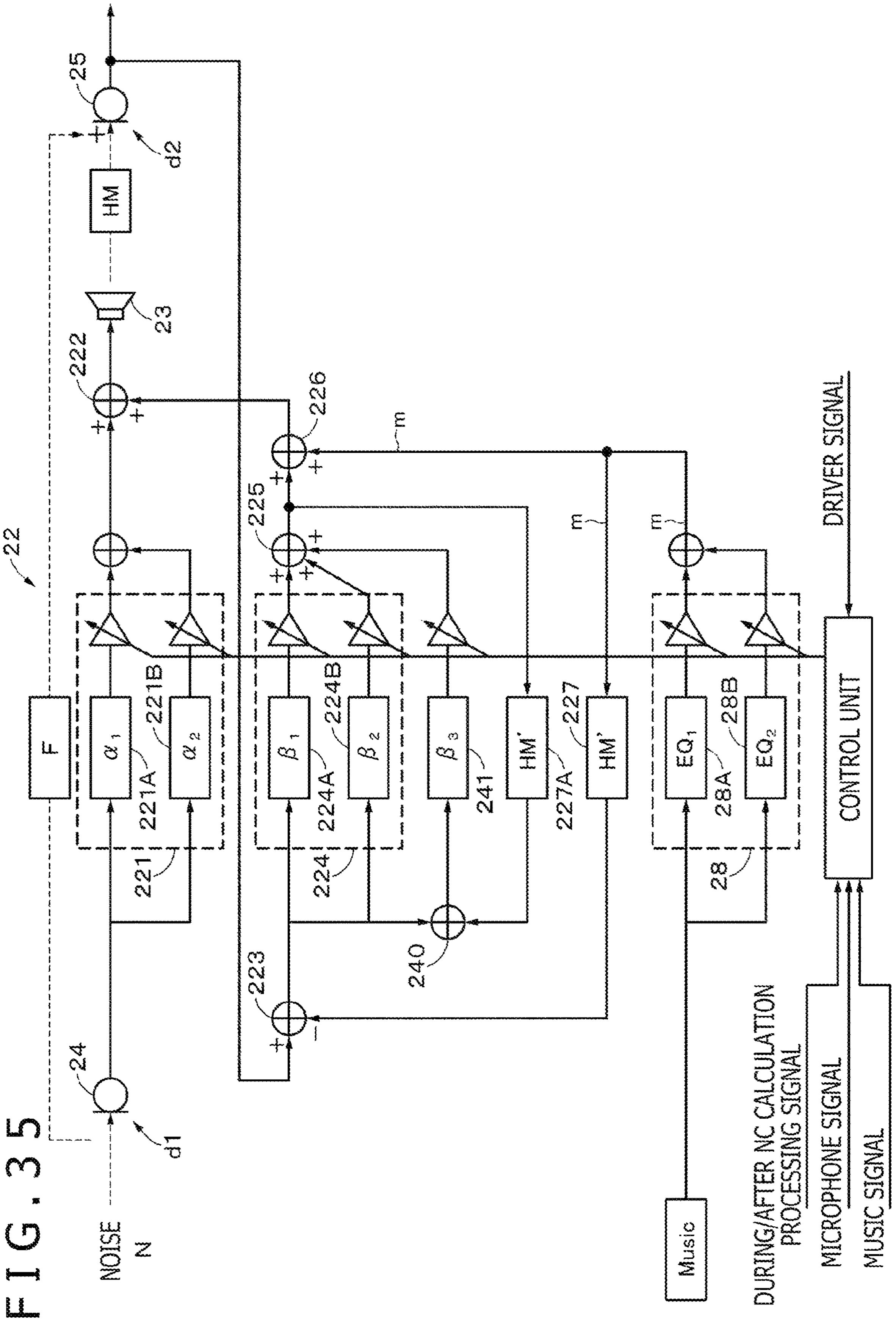
FIG. 35 is a diagram for explaining a modification.

The characteristics of the filter circuit 221 and the equalizer 28 of the configuration depicted in FIG. 33 may be changed in accordance with a change of the characteristic of the filter circuit 224. Moreover, as depicted in FIG. 34, the characteristic of the filter circuit 241 may be changed in accordance with a risk of generation of howling. The characteristics of the filter circuit 221 and the equalizer 28 may be changed in accordance with a change of the characteristic of the filter circuit 241. Moreover, as depicted in FIG. 35, the characteristics of the filter circuits 224 and 241 may be changed in accordance with a risk of generation of howling. The characteristics of the filter circuit 221 and the equalizer 28 may be changed in accordance with a change of the characteristics of the filter circuits 224 and 241.

The acoustic processing apparatus of the present disclosure is not limited to a headphone, but may be applied to an in-ear type earphone, or may be incorporated in an electronic device such as a smartphone and a HUD (Head Up Display).

The configurations, the methods, the steps, the shapes, the materials, the numerical values, and the like included in the embodiment and the modifications described above are presented only by way of example. Configurations, methods, steps, shapes, materials, numerical values, and the like different from those presented here may be used, or replacement with those known is allowed as necessary. Moreover, the configurations, the methods, the steps, the shapes, the materials, the numerical values, and the like included in the embodiment and the modifications may be combined within a range not causing technical inconsistencies. Further, the present disclosure is achievable in any form such as a control method, and an apparatus for manufacturing an electronic device.

In addition, it is not intended that the contents of the present disclosure should be interpreted with limitations imposed by the effects presented by way of example in the present description.

The present disclosure can also have the following configurations.

(1)

An acoustic processing apparatus including:

a sensor that detects deformation of an attachment unit attached to an ear portion of a user; and a control unit that switches a mode for noise cancelling in accordance with a detection result of deformation of the attachment unit.

(2)

The acoustic processing apparatus according to (1), in which the control unit switches the mode in accordance with a transfer function of a sound that is emitted from a speaker and arrives at a microphone for feedback.

(3)

The acoustic processing apparatus according to (1) or (2), in which the control unit switches the mode by switching a characteristic of a filter to be used, in accordance with a change in a transfer function produced in accordance with deformation of the attachment unit.

(4)

The acoustic processing apparatus according to (3), in which the control unit switches the characteristic of the filter such that noise cancelling performance at a certain level or higher is obtained in a case where the transfer function falls within a predetermined range, and the control unit switches the characteristic of the filter such that noise cancelling performance at a certain level or lower is obtained in a case where the transfer function is out of the predetermined range.

(5)

The acoustic processing apparatus according to (3) or (4), in which the filter includes at least a feedback filter.

(6)

The acoustic processing apparatus according to (5), in which the filter includes a feedforward filter.

(7)

The acoustic processing apparatus according to any one of (3) to (6), in which a characteristic of an equalizer that performs an equalizing process for a voice signal reproduced via the attachment unit is further switched in accordance with a change of the transfer function produced in accordance with deformation of the attachment unit.

(8)

The acoustic processing apparatus according to any one of (3) to (6), in which a detection signal to be used for detecting a change of the transfer function is switched.

(9)

The acoustic processing apparatus according to (8), in which the detection signal is switched in accordance with power of a voice signal reproduced via the attachment unit and a level of noise.

(10)

The acoustic processing apparatus according to (9), in which the characteristic of the filter is switched to only a predetermined pattern included in a plurality of patterns defined in accordance with the power of the voice signal and the level of the noise.

(11)

The acoustic processing apparatus according to any one of (1) to (10), in which the acoustic processing apparatus includes the sensor.

(12)

The acoustic processing apparatus according to (11), in which the sensor is at least one of a distance sensor and a pressure sensor.

(13)

The acoustic processing apparatus according to any one of (1) to (12), in which the acoustic processing apparatus is constituted as a headphone.

(14)

An acoustic processing apparatus including:

a control unit that switches a mode for noise cancelling by switching a characteristic of a filter to be used, in accordance with a change in a transfer function produced in accordance with deformation of an attachment unit, in which the control unit switches a detection signal for detecting the change of the transfer function, in accordance with power of a voice signal reproduced via the attachment unit and a level of noise.

(15)

An acoustic processing method including:

causing a sensor to detect deformation of an attachment unit attached to an ear portion of a user; and causing a control unit to switch a mode for noise cancelling in accordance with a detection result of deformation of the attachment unit.

(16)

A program causing a computer to execute an acoustic processing method that causes a sensor to detect deformation of an attachment unit attached to an ear portion of a user and causes a control unit to switch a mode for noise cancelling in accordance with a detection result of deformation of the attachment unit.

REFERENCE SIGNS LIST

10: Headphone
15: Earpad
16: Sensor
20: Control unit
20A: Noise/music analysis unit
20B: Analysis method switching determination unit
20C: Acoustic system change analysis unit
20D: Filter switching determination unit
22: Noise cancel processing unit
23: Speaker
24: FF microphone
25: FB microphone
28: Equalizer
221, 224, 224A, 224B: Filter circuit

The invention claimed is:

1. An acoustic processing apparatus, comprising:
- a sensor configured to detect deformation of an earpad, wherein the earpad is attachable to a user ear portion; and
- a control unit configured to switch a mode for noise cancellation of a sound, wherein the mode is switched based on:
  - a transfer function of the sound that is emitted from a speaker and arrives at a microphone for feedback, and
  - the detected deformation of the earpad.

2. The acoustic processing apparatus according to claim 1, further comprising a filter, wherein the control unit is further configured to:
- detect a change in the transfer function based on the detected deformation of the earpad;
- switch a characteristic of the filter based on the detected change in the transfer function; and
- switch the mode for the noise cancellation based on the switched characteristic of the filter.

3. The acoustic processing apparatus according to claim 2, wherein
- the control unit is further configured to obtain, based on the switched characteristic of the filter, noise cancelling performance at one of a specific level or higher than the specific,
- the noise cancelling performance at the one of the specific level or higher than the specific level is obtained in a case where the transfer function is within a specific range, and
- the control unit is further configured to obtain, based on the switched characteristic of the filter, the noise cancelling performance at one of the specific level or lower than the specific level, and
- the noise cancelling performance at the one of the specific level or lower than the specific level is obtained in a case where the transfer function is out of the specific range.

4. The acoustic processing apparatus according to claim 2, wherein the filter includes at least a feedback filter.

5. The acoustic processing apparatus according to claim 4, wherein the filter further includes a feedforward filter.

6. The acoustic processing apparatus according to claim 2, further comprising an equalizer, wherein
- the earpad is configured to reproduce a voice signal,
- the equalizer is configured to perform an equalizing process for the reproduced voice signal, and
- the control unit is further configured to switch a characteristic of the equalizer based on the detected change of the transfer function.

7. The acoustic processing apparatus according to claim 2, wherein the control unit is further configured to:
- switch a detection signal; and
- detect the change of the transfer function based on the switched detection signal.

8. The acoustic processing apparatus according to claim 7, wherein
- the earpad is configured to reproduce a voice signal, and
- the detection signal is switched based on a power of the reproduced voice signal and a level of noise.

9. The acoustic processing apparatus according to claim 8, wherein
- the characteristic of the filter is switched to only a specific pattern of a plurality of patterns, and
- each pattern of the plurality of patterns is based on the power of the reproduced voice signal and the level of the noise.

10. The acoustic processing apparatus according to claim 1, wherein the sensor is at least one of a distance sensor or a pressure sensor.

11. The acoustic processing apparatus according to claim 1, wherein the acoustic processing apparatus is a headphone.

12. An acoustic processing apparatus, comprising:
- a control unit configured to:
  - detect a change in a transfer function of a sound based on deformation of an earpad;
  - switch a characteristic of a filter based on the detected change in the transfer function; and
  - switch a mode for noise cancellation of the sound based on the switched characteristic of the filter, wherein
  - the control unit is further configured to switch a detection signal based on a power of a voice signal and a level of noise, and
  - the switched detection signal is for the detection of the change in the transfer function.

13. An acoustic processing method, comprising:

detecting, by a sensor, deformation of an earpad, wherein the earpad is attachable to a user ear portion; and switching, by a control unit, a mode for noise cancellation of a sound, wherein the mode is switched based on:

a transfer function of the sound that is emitted from a speaker and arrives at a microphone for feedback, and the detected deformation of the earpad.

14. A non-transitory computer-readable medium having stored thereon, computer executable instructions, which when executed by a computer, cause the computer to execute operations, the operations comprising:

detecting deformation of an earpad, wherein the earpad is attachable to a user ear portion; and switching a mode for noise cancellation of a sound, wherein the mode is switched based on:

a transfer function of the sound that is emitted from a speaker and arrives at a microphone for feedback, and the detected deformation of the earpad.

* * * * *